US012231575B2

(12) United States Patent
Enke et al.

(10) Patent No.: US 12,231,575 B2
(45) Date of Patent: *Feb. 18, 2025

(54) TRUSTED CONTEXTUAL CONTENT

(71) Applicant: Skydio, Inc., Redwood City, CA (US)

(72) Inventors: Joseph Anthony Enke, Campbell, CA (US); Stepan Moskovchenko, Belmont, CA (US)

(73) Assignee: Skydio, Inc., San Mateo, CA (US)

(*) Notice: Subject to any disclaimer, the term of this patent is extended or adjusted under 35 U.S.C. 154(b) by 655 days.

This patent is subject to a terminal disclaimer.

(21) Appl. No.: 17/322,341

(22) Filed: May 17, 2021

(65) Prior Publication Data

US 2021/0273815 A1    Sep. 2, 2021

Related U.S. Application Data

(63) Continuation of application No. 15/978,463, filed on May 14, 2018, now Pat. No. 11,025,429.

(51) Int. Cl.
*H04L 9/32* (2006.01)
*H04L 9/08* (2006.01)

(52) U.S. Cl.
CPC .......... *H04L 9/3247* (2013.01); *H04L 9/0861* (2013.01); *H04L 9/321* (2013.01)

(58) Field of Classification Search
CPC ............. G06T 1/005; G06T 2201/0064; G06T 1/0042; H04N 1/00106; H04N 1/00119;
(Continued)

(56) References Cited

U.S. PATENT DOCUMENTS 10,185,316 B2    1/2019  Kablaoui
10,467,891 B1 *  11/2019  Bart .................. B64D 47/06
(Continued)

FOREIGN PATENT DOCUMENTS

JP    2003524948 A    8/2003
JP    2004260533 A    9/2004
(Continued)

OTHER PUBLICATIONS

Japanese Office Action mailed on Jun. 6, 2023 in corresponding Japanese Patent Application No. 2020-564393.
(Continued)

*Primary Examiner* — Olugbenga O Idowu
(74) *Attorney, Agent, or Firm* — Young Basile Hanlon & MacFarlane, P.C.

(57) ABSTRACT

Described herein are systems for the production, communication, routing, service, authentication, and consumption of cryptographically authenticable contextual content produced by cryptographically authenticable devices; example implementations of the architecture for a Trusted Contextual Content Device which produces Trusted Contextual Content; and example implementations of the architecture for a Trusted Drone Device which produces Trusted Contextual Content. For example, some of the methods used may include accessing a first set of sensor data from one or more sensors; receiving, a first trusted contextual content that includes a first digital signature; generating a data structure including the first trusted contextual content and data based on the first set of sensor data; signing the data structure using a signing key to generate a second trusted contextual content including a second digital signature; and storing or transmitting the second trusted contextual content.

24 Claims, 14 Drawing Sheets

(58) Field of Classification Search
CPC ....... H04N 1/32272; H04N 2201/3235; H04N 2201/3236; H04N 2201/3252; H04N 2201/3253; H04N 2201/3281; H04N 5/23222; H04N 5/23258; H04N 5/44; H04N 1/32144; H04N 1/32331; H04N 2201/3214; H04N 2201/3215; H04N 2201/323; H04N 2201/3254; H04W 48/16
See application file for complete search history.

(56) References Cited

U.S. PATENT DOCUMENTS

| | | |
|---|---|---|
| 2012/0237022 A1 | 9/2012 | Berson et al. |
| 2013/0261927 A1 | 10/2013 | Erickson et al. |
| 2015/0188938 A1 | 7/2015 | Freeze-Skret |
| 2017/0085539 A1 | 3/2017 | Wishard |
| 2017/0140490 A1* | 5/2017 | Leonard ............. H04N 23/6812 |
| 2018/0096497 A1 | 4/2018 | Bennett et al. |

FOREIGN PATENT DOCUMENTS

| | | |
|---|---|---|
| JP | 2017509034 A | 3/2017 |
| JP | 2018511248 A | 4/2018 |
| WO | 2011068738 A2 | 6/2011 |
| WO | 2016160593 A1 | 10/2016 |

OTHER PUBLICATIONS

International Search Report in corresponding International Application PCT/US2019/032091, dated Jul. 12, 2019, 11 pages.

* cited by examiner

TRUSTED CONTEXTUAL CONTENT

CROSS-REFERENCE TO RELATED APPLICATION(S)

This application claims priority to and the benefit of U.S. application patent Ser. No. 15/978,463, filed May 14, 2018, the entire disclosure of which is hereby incorporated by reference.

TECHNICAL FIELD

This disclosure relates to generation and transfer of trusted contextual content.

BACKGROUND

Many devices (e.g., drones, cameras, vehicles, or security systems) produce data or content, such as video, motion data, timestamps, global positioning system coordinates, or lidar point clouds. Encryption is used to secure data during communication and storage to prevent unauthorized access and tampering with the secured data. Content may be corrupted or spoofed prior to encryption. Content can be particularly susceptible to mischaracterization when examined in isolation.

SUMMARY

Disclosed herein are implementations of generation and transfer of trusted contextual content.

In a first aspect, the subject matter described in this specification can be embodied in systems that include a trusted contextual content device that includes one or more sensors and is configured to access sensor data from the one or more sensors and sign the sensor data using a signing key to generate a trusted contextual content including a digital signature; an authentication device that is configured to receive the trusted contextual content and authenticate the trusted contextual content based on the digital signature; and a contextual content consumer device that is configured to transmit a request to authenticate the trusted contextual content to the authentication device, and, responsive to an authentication message received from the authentication device, present the sensor data in a user interface.

In a second aspect, the subject matter described in this specification can be embodied in systems that include one or more sensors and a processing apparatus configured to access a first set of sensor data from the one or more sensors; receive, a first trusted contextual content that includes a first digital signature; generate a data structure including the first trusted contextual content and data based on the first set of sensor data; sign the data structure using a signing key to generate a second trusted contextual content including a second digital signature; and store or transmit the second trusted contextual content.

In a third aspect, the subject matter described in this specification can be embodied in methods that include accessing a first set of sensor data from one or more sensors; receiving, a first trusted contextual content that includes a first digital signature; generating a data structure including the first trusted contextual content and data based on the first set of sensor data; signing the data structure using a signing key to generate a second trusted contextual content including a second digital signature; and storing or transmitting the second trusted contextual content.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
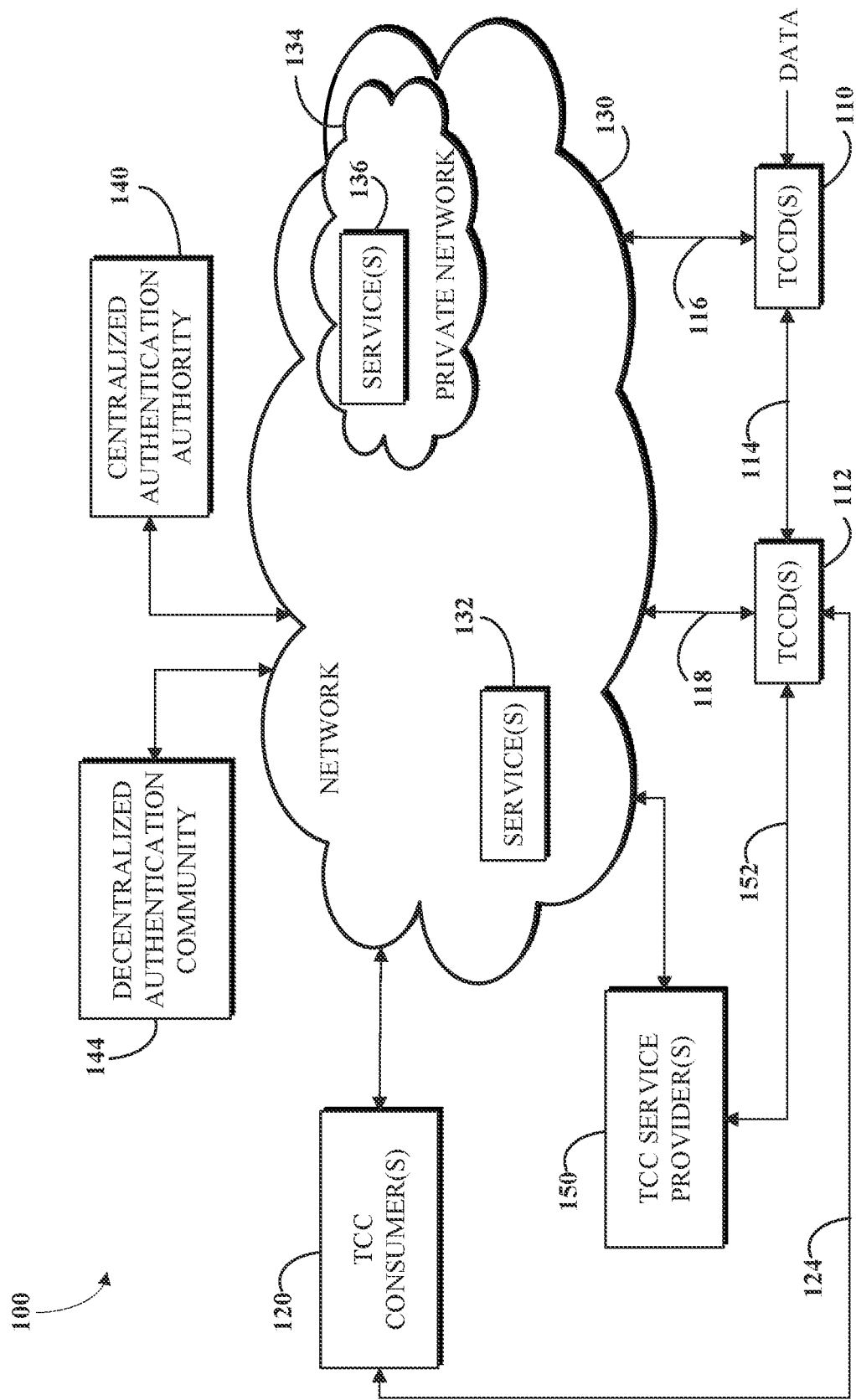
FIG. 1 is a block diagram of an example of a system for managing trusted contextual content.

As used herein, "contextual content" (CC) is data that is organized in such a way that it can be used to understand or assess some physical attributes of a given situation, place, area, or object within some timeframe. For example, a digital picture file of a house may contain content which can be used to assess physical attributes of the house at some given location and time. As used herein, a "contextual content device" (CCD) is a device which produces contextual content. As used herein, "trusted contextual content" (TCC) is contextual content which is cryptographically authenticable. As used herein, a "trusted contextual content device" (TCCD) is a device which produces trusted contextual content and is cryptographically authenticable.

Conventional systems for the generation of contextual content may present a number of problems. For example, it may be easy to counterfeit and clone these devices that generate the contextual content. It may be easy to corrupt, fabricate, amend, selectively reduce, remove, and maliciously compromise the content produced by these devices. Content may inadvertently become corrupt, removed, selectively reduced, or compromised. Corruption of content may be difficult to detect. There is no way to tell if contextual content has been compromised once it has been removed, communicated, or transported off of the device. As a contextual device consumer there may be no way to tell with certainty if the contextual content is authentic, what device it came from, or if the device was authentic. In cases where devices are authentic there is often no way to detect or prevent malicious versions of bootloader, firmware, and software from executing on the device or temporarily executing on the device to compromise the contextual content. Authentication schemes are typically either controlled by a single authority, group of authorities, or a community but not by a combination of authority, authorities, and communities. Authentication schemes are typically binary such that a device or content is either deemed authentic or not authentic and do not provide metrics and or scores for the level of authenticity or trustworthiness of devices, and content. Typical solutions tend to focus on security and encryption but do not guarantee the authenticity of the contextual content itself. That is, most systems attempt to protect the access to the contextual content, rather than reliably prove that the contextual content is both the intended contextual content from a specific device and that the intended contextual content reliably represents the actual environment and events that took place where and when the device was present and used its onboard sensors to collect data and produce contextual content. Other products and solutions do not produce cryptographically verifiable contextual content which may trace back its source.

Many applications require contextual content to be authentic. An architecture for Trusted Contextual Content may reliably deliver authentic contextual content from a device to a user. It is fundamentally problematic if contextual content is malformed, tampered with, incomplete, fabricated, or otherwise altered or attacked whether for malicious or other benign reasons. For example, it is problematic if falsified or corrupted thermometer device averaged, time-stamped, calibrated temperature readings as proof in an insurance claim that some other device's warranty is void due to being stored at too high of a temperature. Another example is if camera, location, and time data are collected by a drone to positively identify a suspect in a crime at a specific time and place. It is important that the data is accurate, unaltered, uncorrupted and collected from the correct device when presented in a court room. It is then important that it is impossible or prohibitively difficult for the contextual content to be falsified or corrupted from the time that it is captured to the time that it is used to make such a decision.

Additionally, it is also problematic for the content producer if the content consumer is not the intended recipient. Additionally, it is fundamentally problematic for the content consumer if the content producer is not the intended deliverer. It is also problematic if data can be fabricated or altered by producing or utilizing a counterfeit or unauthorized device and or device clone. It is also sometimes desired for the contextual content to remain private from production to consumption. Additionally, there may be many producers and many consumers of unique contextual content.

Often, it is not desirable to have a binary answer to the question of whether a device or content is authentic as it may be more important to evaluate the level of authenticity and trustworthiness. Similarly, different situations, times, and evaluators may have differing metrics for evaluating authenticity and trustworthiness. Systems and methods for generating and managing trusted contextual content may addresses these problems.

The architectures described herein may provide cryptographically verifiable authentication and encryptions schemes for implementing trustworthy devices that produce trustworthy contextual data. The systems provides a flexible architecture to further corroborate the data using additional trustworthy devices. The architecture provides methods for using untrusted devices intermixed with trusted devices to still produce trusted contextual content. The architecture provides a flexible authentication scheme which allows for centralized authentication authorities, authentication communities, or a combination of both. The architecture allows for flexible authentication schemes with authentication and trustworthiness metrics and scores that may change over time or be evaluated differently based on the situation or the evaluator.

The architecture may include a trusted contextual content device, trusted components, and trusted sensors. In some implementations, a trusted contextual content device is used for robotics and specifically drones. In some implementations, mixed centralized and community based authentications schemes and/or Non-binary authentication schemes are utilized. Methods and algorithms for computing metrics and scores to evaluate the trustworthiness and authenticity of devices and data may be implemented. In some implementations, a data structure for the storage and transport of trusted contextual content is used, which allows further contextual content and signatures to be appended and allows authenticators to easily verify and or evaluate the contextual content represented by the data structure as well as the devices which produced the contextual content and signatures.

FIG. 1 is a block diagram of an example of a system 100 for managing trusted contextual content. In this architecture there are one or more Trusted Contextual Content Devices (TCCDs) (110 and 112) which collect data and produce Trusted Contextual Content (TCC). These devices deliver TCC to other TCCDs, non-trusted contextual content devices, software services (132 and 136) via public and private networks (e.g., the network 130 and/or the private network 134), as well as directly to trusted contextual content service provider devices 150, and trusted contextual content consumer devices 120 (e.g., a desktop computer). TCCDs (110 and 112) may connect to networks (e.g., the network 130) as wired or wireless devices. For example, the TCCDs 110 and 112 may connect to the each other via a wireless connection 114, which may use Wi-Fi, Bluetooth, ZigBee, proprietary, or other types of wireless technology, protocols, and standards. For example, the TCCDs 110 and 112 may connect to the network 130 via respective wireless connections 116 and 118, which may use Wi-Fi, 3G, LTE, proprietary, or other types of wireless technology, protocols, and standards. It is important to note that TCCDs may also be consumers of TCC and may consume TCC from other TCCDs and non-trusted devices via pass through, software services (132 and 136) via public and private networks (130 and 134), TCC consumer devices 120 and TCC service provider device 150.

The system 100 optionally includes one or more TCC Service provider device 150 which may consume, store, alter, enhance, selectively reduce, deliver, and or in some other way add value in the form of a service to the TCC, TCCD, and or TCC consumer devices 120.

In this architecture there are one or more TCC consumer devices 1120 which consume TCC and utilize services.

The system 100 there are one or more centralized authentication authority devices 140 and/or decentralized authentication community devices 144, which are responsible for mutually authenticating any combination of two: TCCD, TCCD user, TCC service, TCC service provider, and or TCC consumer. Mutual authentication helps to enhance privacy by verifying that the identities of the two parties who are communicating are the intended parties with which one another are attempting to communicate. Additionally, authentication authorities and or communities are responsible for authenticating TCC. For example, a TCC consumer would like to validate that the TCCD and/or TCCD user who generated some specific TCC are genuinely those indicated by the TCC internal data structures. Similarly, a TCCD user will want to validate the identity of the intended TCC recipient. For example, the centralized authentication authority device 140 may be implemented as a certificate authority or a chain of certificate authorities. For example, a decentralized authentication community (including the decentralized authentication community device 144) may be implemented as a web of trust (e.g., a community utilizing PGP and GPG protocols), a majority of trust (e.g., a public database or ledger where a majority of the participants in the community must agree), a consensus of trust (e.g., a public database or ledger where all of the participants in the community must agree), or a vote of trust (e.g., a public database or ledger where all of the participants in the community have an opportunity to vote, the results are recorded, and can be evaluated immediately or at a later time to determine authenticity or trustworthiness).

The system 100 may enable non-binary authentication. Binary authentication would either deem the identity of a device and authenticity of content to be either true or false. In such a system, communication with a device would typically terminate if the identity is deemed false. Similarly, there would be no motivation to pass along content which is deemed not authentic. A typical example of binary device authentication would be a certificate authority checking that a device certificate is registered with a certificate authority and has a proper chain of trust that roots back in some way to the certificate authority. Similarly, for TCC one or more signatures in a TCC data structure can be validated. Device identity may then be validated. Using non-binary authentication allows for provision of assigning a score or metric to device identity as well as content. Thresholds and evaluation metrics can be used to decide based on system requirements whether communication with a device is permitted or content should be propagated. It also becomes possible to re-evaluate such scores and metrics at a later time if they are appended to the TCC data structure. For example, a certificate authority may deem a device identity as valid but have further information that such a device may be possible to counterfeit with some very large cost and resources. It may then provide a metric to indicate this. For example, using a real number greater than or equal to zero and less than or equal to one, where zero represents completely false (device or content is not believed to be authentic whatsoever) and 1 represents completely true (device or content is believed to be completely authentic). A threshold could be defined within this range such that if the metric is greater than or equal to the threshold the device or content is evaluated as authentic. In the example above the device could have received a metric of 0.3 from the certificate authority and a threshold of 0.25 could have been used for the given application and time, this would result in the device or content being authenticated since the metric is greater or equal to the threshold. It is worth noting that checking this metric with different authorities and at different times could result in a different result. For example, if it was later found that some technology was developed to make it very simple to counterfeit these devices then the metric may be lowered to some smaller value, for example 0.001. In this case, the device would no longer be able to be authenticated unless the threshold was lowered substantially. Since these metrics potentially add further context to TCC, it is possible to treat them as contextual content, append them to TCC and sign them to produce new TCC.

In a hybrid authentication scheme, two or more of these methods could be used. It would be up to the system implementation and requirements to define rules on what types of authentication could be allowed for different functions and how they are evaluated. For example, it is possible to use a community to establish a web of trust for TCC authentication and weight the community evaluations (e.g., including from the decentralized authentication community device 144) by 60% and also use a certificate authority evaluation (e.g., from the centralized authentication authority device 140) weighted by 40%. In such a scheme, the community could evaluate some TCC with a metric of 0.8 and the certificate authority could evaluate it as 0.7. Using the weights this would evaluate to an overall metric as follows:

$$(\text{metric\_1} * \text{weight\_1}) + \qquad\qquad [\text{EQ 1}]$$
$$(\text{metric\_2} * \text{weight\_2}) + \ldots (\text{metric\_n} * \text{weight\_n}) =$$
$$(0.8 * 0.6) + (0.7 * 0.4) = 0.48 + 0.28 = 0.76$$

The system 100 includes one or more public networks 130 and/or private networks 134 which are used for communication transport and interconnect of TCCDs (110 and 112), TCC service provider devices 150, TCC consumer devices 120, a centralized authentication authority device 140, a decentralized authentication community devices 144, and services 132. Additionally, services 136 may be hosted on private networks 134.

The system 100 optionally includes one or more TCC service provider devices 150 which may consume, store, alter, enhance, selectively reduce, deliver, produce, and or in some other way add value to the TCC, TCCD 110 or 112, and or TCC consumer devices 120. In some implementations, the TCC service provider device 150 transfers information for services and maintenance via communications over the network 130. In some implementations, the TCC service provider device 150 transfers TCC and information for management and services via communications over the communications link 152 (e.g., Wi-Fi, Bluetooth, ZigBee, or other wireless communications link) to the TCCD 112. It is notable that TCC service provider devices 150 may both produce and consume TCC. For example, one embodiment of a service could detect faces and objects within TCC which contains video. Another embodiment could search TCC for specific occurrences or events such as objects in TCC which contains video or proximity to a geographic location or point of interest in TCC which contains location with respect to global reference.

In some implementations (not shown in FIG. 1), TCC service provider device 150 may be omitted, and the TCC consumer device 120 connects directly to the TCCD 112 via the network 130 or via a direct point-to-point communications link or memory transfer 124.

In some implementations (not shown in FIG. 1), a single organization to implement the system 100 in a closed manner such that a device manufacturer, a service provider, a content consumer, and an authentication authority/community are all one entity. An example of this would be an entity with a closed private network behind a firewall which manufactures its own TCCD camera and uses it internally, delivers TCC to internally developed software services running on its own private network, provides mutual authentication via its own internal community and has internal organizations or internal individuals who consume the TCC via the software services. FIG. 1 would then become greatly simplified albeit valid.

Figure 2:
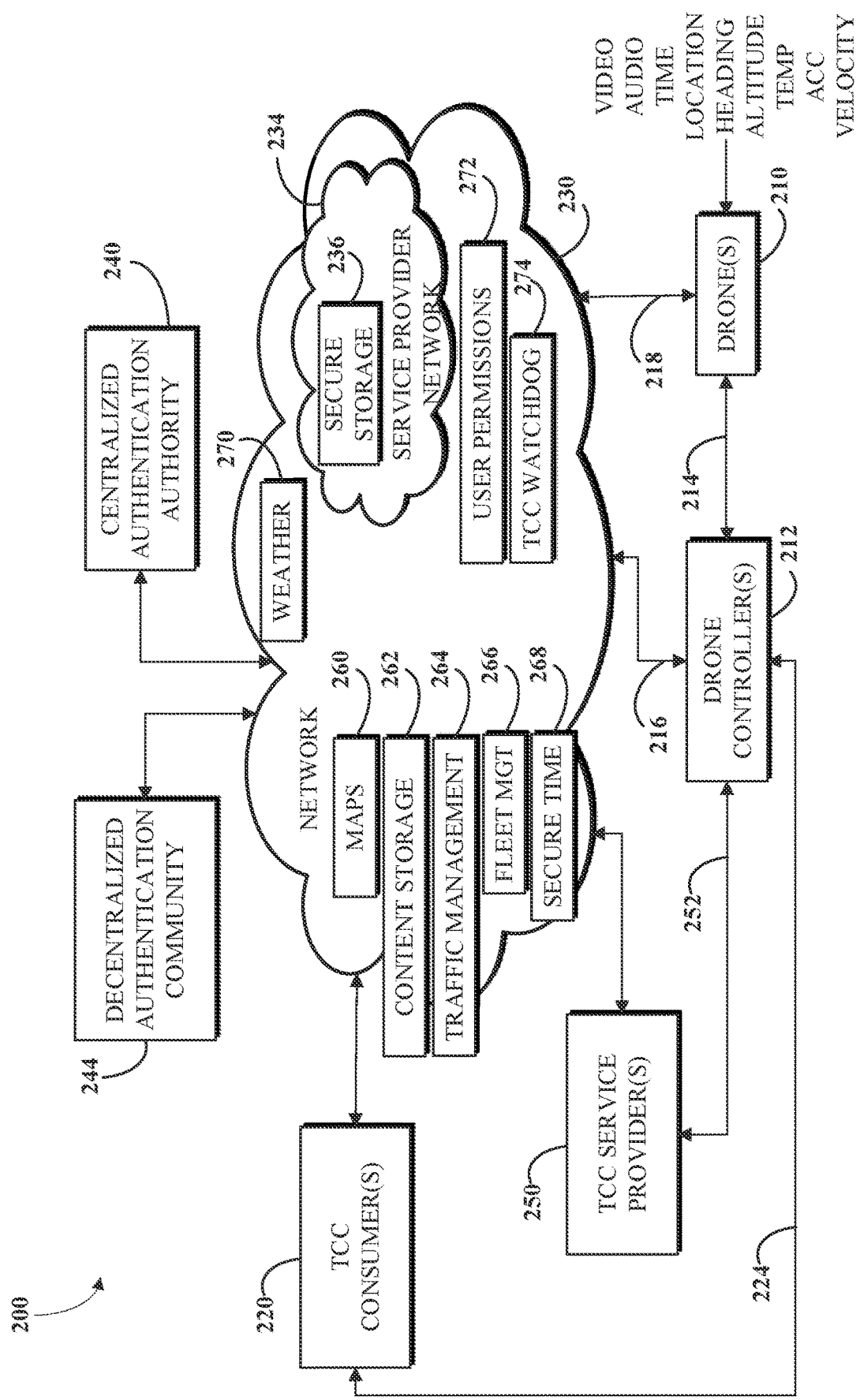
FIG. 2 is a block diagram of an example of a system for managing trusted contextual content generated by drones.

FIG. 2 is a block diagram of an example of a system 200 for managing trusted contextual content generated by drones. In this implementation a TCCD is a drone 210 which collects data from various video, audio, time, location, heading, altitude, temperature, and acceleration, and velocity sensors, processes the data to produce content, further processes the content to produce contextual content, optionally encrypts the contextual content to produce encrypted contextual content, and signs the encrypted contextual content to produce TCC. The contextual content can be considered trusted due to the fact that other players in the system can both authenticate the TCCD as well as the TCC. The TCCD drone 210 passes TCC to a TCCD drone controller 212 via a wireless communication link 214 (e.g., a Wi-Fi, Bluetooth, or ZigBee link). For example, the drone 210 and the drone controller 212 may connect to the network 230 via respective wireless connections 216 and 218, which may use Wi-Fi, 3G, LTE, proprietary, or other types of wireless technology, protocols, and standards. It is notable that in a different implementation it is also valid for the drone 210 to pass TCC to a TCCD smart device, non-trusted smart device, non-trusted drone controller, directly to a service (e.g., the fleet management service 266) via a public network 230 or private network 234 (e.g., a Wi-Fi or LTE network), directly to a TCC service provider device 250, or directly to a TCC consumer device 220. In some implementations, the TCC consumer device 120 connects to the drone controller 212 via the network 230 or via a direct point-to-point communications link or memory transfer 224. For example, the TCC consumer device 220 may be utilized by a court, a law firm, a public safety officer, and/or a law enforcement officer.

The drone 210 may also consume TCC, for example, a trusted time source from the secure time service 268. The drone 210 also produces TCC, for example, a time reference from its Global Navigation Satellite System (GNSS) sensor system. Additionally, the drone 210 could have an internal tamperproof time source. By correlating all of these independent references of similar content, the TCCD becomes more difficult to attack, falsify, or accidentally corrupt given that multiple sources would need to reflect the same errors. It is possible to have many such combinations of independent references of non-correlated data to strengthen the device's trustworthiness. Additionally, these sources can be cross-checked to detect faults, tampering, or an attack on the device. Faults, tampering, and attacks can be reported within the TCC itself and the device (e.g., the drone 210) can stop producing and transmitting TCC when these events are detected or alter the device user.

The TCCD Drone controller 216 passes TCC to TCC Service provider device(s) 250 directly as well as to TCC services (e.g., a secure storage service 236) via a public network 230 and/or a private network 234.

The drone 210 and drone controller 212 are consumers of the traffic management 264, fleet management 266, and secure time 268 services as well as producers of TCC for the content storage 262, traffic management 264, fleet management 266, and secure storage service 236.

For example, a traffic management service 264 may provide updates of other aerial vehicles in the area, restricted flight zones, and temporary flight restrictions and altitude restrictions. The traffic management service 264 could also use TCC from the drone 210 to determine its geographic location, altitude, heading, velocity, wind, and weather estimation. The traffic management service 264 can authenticate the TCC and TCCD to assert trustworthiness and update its database so that other aerial vehicles can utilize this information. This is an example of a TCC service provider taking TCC from potentially many TCCDs and adding value to all TCC consumers via the ability to present a trustworthy representation of air traffic given that it can validate time, geographic location, altitude, velocity, and bearing of many authenticated devices.

For example, a fleet management service 264 could provide ability to add, remove, provision, assign, allocate, de-allocate, track maintenance for TCCDs and TCCD users.

For example, a secure time service 268 (e.g., Secure NTP) could provide TCC to TCCDs as well as other players in the system to give a trusted reference for time. Time is a common reference for almost all content and contextual content. One embodiment could include time from a secure time service 268 in a device's TCC as well as publish a hash of the devices TCC to a service or a public ledger soon after the TCC is produced. A TCC consumer or verifier can use a combination of the time embedded in the TCC (a lower bound) and the time that the service or public ledger was updated (an upper bound) to establish a provable time range of when TCC was produced and therefor when the events which the TCC describes occurred.

For example, content storage 262 and secure content storage 236 services could provide persistent backup, upload, and download of TCC that is both generated by TCCDs as well as other services.

The system 200 includes one or more centralized authentication authority devices 240 and/or decentralized authentication community devices 244, which are responsible for mutually authenticating any combination of two: TCCD, TCCD user, TCC service, TCC service provider, and or TCC consumer. For example, the centralized authentication authority device 240 may be utilized by a drone manufacturer, a drone system on a chip manufacturer, a regulatory authority, or a private authority. For example, the centralized authentication authority device 240 may be implemented as a certificate authority or a chain of certificate authorities. For example, a decentralized authentication community (including the decentralized authentication community device 244) may be implemented as a web of trust (e.g., a community utilizing PGP and GPG protocols), a majority of trust (e.g., a public database or ledger where a majority of the participants in the community must agree), a consensus of trust (e.g., a public database or ledger where all of the participants in the community must agree), or a vote of trust (e.g., a public database or ledger where all of the participants in the community have an opportunity to vote, the results are recorded, and can be evaluated immediately or at a later time to determine authenticity or trustworthiness). For example, the decentralized authentication community device 244 may be utilized by a citizen, a watchdog entity, a drone user, or TCC consumers.

For example, the TCC service provider device 250 may be utilized by a drone manufacturer, a cloud service provider, a drone insurance provider, or a drone repair/replacement provider. In some implementations, the TCC service provider device 250 transfers information for services and maintenance via communications over the network 230. In some implementations, the TCC service provider device 250 transfers TCC and information for management and services via communications over the communications link 252 (e.g., Wi-Fi, Bluetooth, ZigBee, or other wireless communications link) to the drone controller 212.

For example, other services available via the network 230 could include a maps service 260, a weather service 270, a user permissions service 272, and a TCC watchdog service 274.

Figure 3:
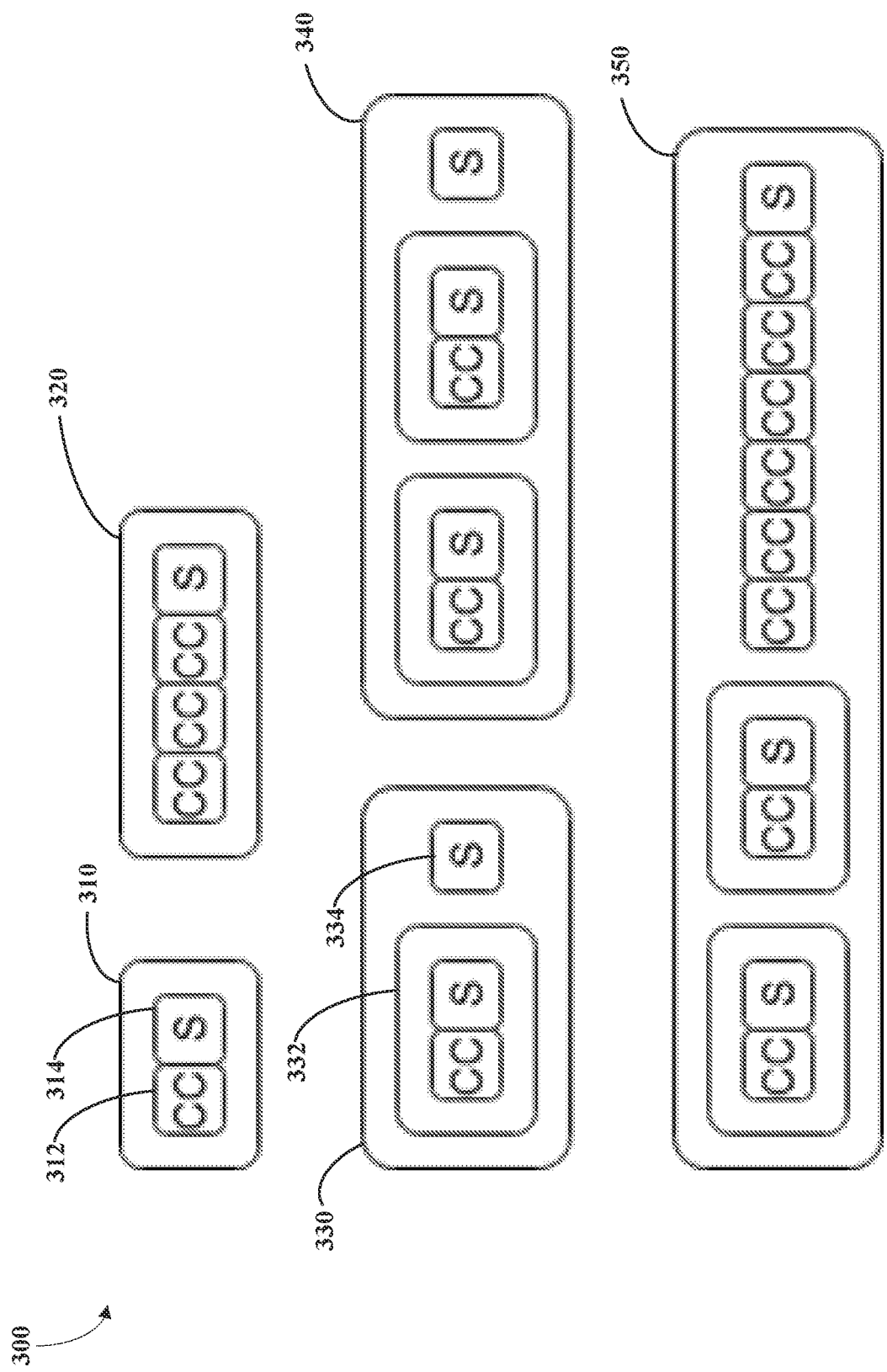
FIG. 3 is a memory map showing an example of a format for trusted contextual content.

FIG. 3 is a memory map 300 showing an example of a format for trusted contextual content. Contextual content is data from one or more sources optionally combined with intrinsic data which is processed and organized in such a way that an environment and events can be understood and assessed. An architecture for Trusted Contextual Content defines a data structure for the storage and transport of Trusted Contextual Content (TCC). TCC may be cryptographically verifiable and auditable. The TCC uses digital signatures to utilize known methods for aligning, authentication, identification, and verification. FIG. 3 shows many examples of valid formatted Trusted Contextual Content where "Contextual Content" is abbreviated as "CC" and "Signature" is abbreviated as "S". The data structure for TCC 310 may include contextual content 312 and a means for authentication such as a signature 314. For example, one format for TCC 310 may be defined as contextual content 312 followed by a digital signature 314. The data structure may define the format of contextual content to be stored in a self-describing format which could include a description of the signature itself and may optionally include the signature within the contextual content itself. For example, XML is a self-describing format and may include tag value pairs for the total length of its own data structure, as well as information about the version and protocol, content about the device that generated the TCC, as well as the contextual content itself including scalars, units, and temporal data. For example, the TCC 320 includes multiple blocks of related contextual content and a digital signature for the multiple blocks of contextual content that has been signed by a TCCD (e.g., the drone 210). It is possible to define tag value pairs that may point to external files or data as well as a value which could authenticate the external data. For example, a tag value pair that points to an external video file with a signature of the video file. Since TCC is contextual content itself, it is valid to have contextual content and/or TCC followed by additional contextual content and or TCC as well as encapsulated TCC as long as it is appended with the expected digital signature. For example, the TCC 330 includes a TCC 332 (e.g., from a trusted sensor, such the trusted sensor 710) that has encapsulated with a new digital signature 334 applied by a TCCD (e.g., the drone 210). For example, the TCC 340 includes multiple encapsulated TCCs with a new digital signature (e.g., from the TCCD 510). For example, the TCC 350 includes multiple encapsulated TCCs and multiple additional blocks of CC with a new digital signature (e.g., from the TCCD drone 910).

This format allows for a TCC consumer or authenticator to easily examine the data structure to both understand the TCC as well as authenticate the TCC and or the device which produced it. This format allows for multiple devices and services to append additional data and signatures as the data structure is passed along. Appending data may include applying an additional signature that may include the entire data structure with all previous signatures included which makes it cryptographically difficult to change any data included in the structure.

Figure 4:
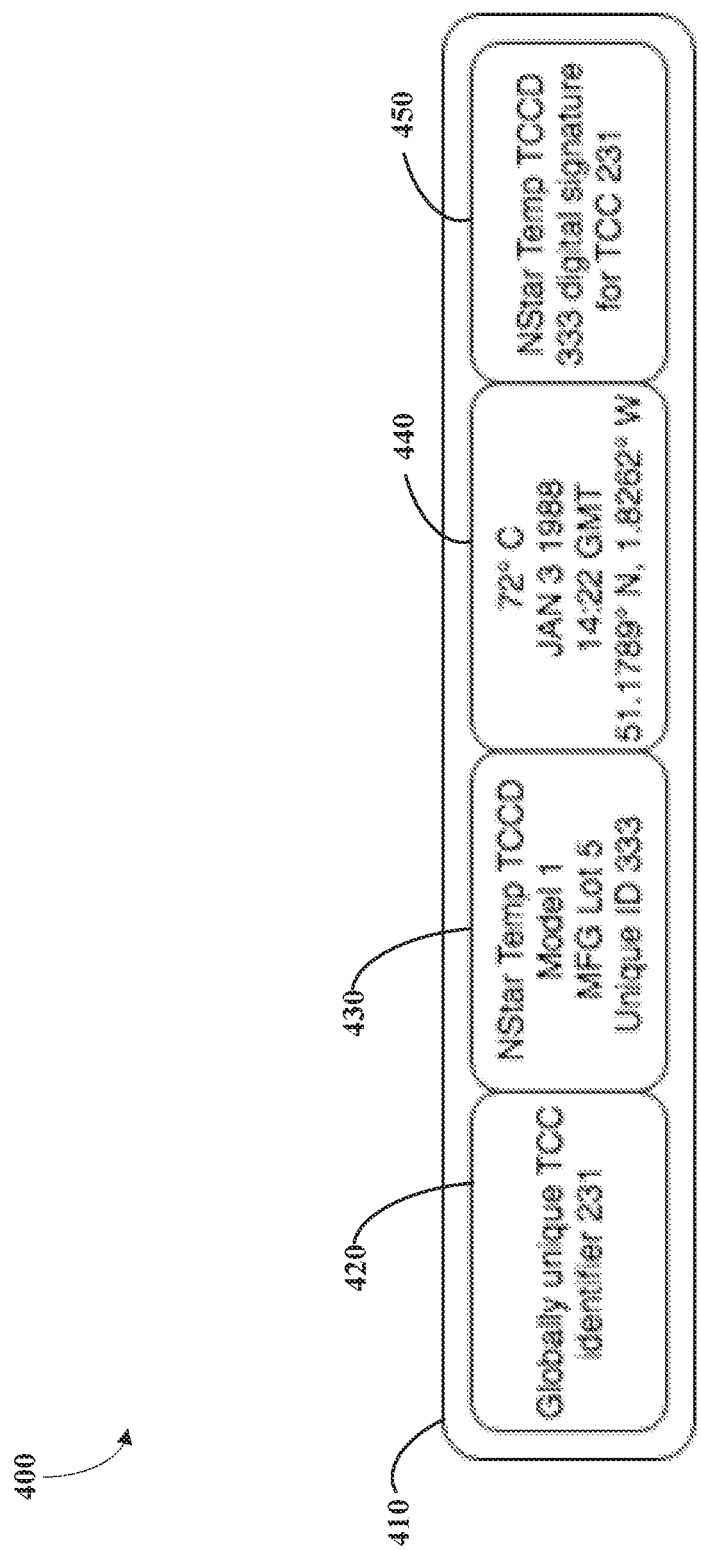
FIG. 4 is a memory map showing an example of a trusted contextual content.

FIG. 4 is a memory map 400 showing an example of a trusted contextual content. FIG. 4 shows an example of TCC 410 that could be produced by a temperature measurement device. In the example a device implementation chooses to include some intrinsic data as contextual content: a one-time use globally unique number 420 such that no similar message could likely be fabricated. The TCC 410 also includes manufacturer information 430, such as manufacturer name, device name, device model number, manufacturer lot number, and unique device ID. The TCC 410 includes some measured data 440 which describes the environment and events of a given place and time can be more fully understood: temperature in degrees Celsius; calendar month, day, and year; time relative to GMT; Earth geographic location in degrees North and West, WiFi SSID or cellular tower identifiers. The TCC 410 includes a digital signature 450 which is specific to the data structure with unique global ID using the device's signing key. This format allows an authenticator to validate the data structure using the device's public data and allows a TCC consumer to easily interpret the TCC 410 without having to communicate directly with the TCCD which produced the TCC 410.

Note that a device's public data (for example public keys and device certificates) may be considered contextual content and directly embedded in the data structure. Note that encrypting this data structure for data privacy is optional and not necessary for TCCD and TCC authentication. Note that a TCCD may produce data which either directly evaluate or can be used to later evaluate contextual content. Such data can be considered contextual content itself and directly embedded into the data structure. For example, a TCCD with 3 temperature sensors where 2 are producing valid readings as expected the third is producing suspected invalid readings which are deemed to be statistically improbable for the given environment. Such a device may include all three readings in its TCC, it may include only a single reading and a quality score based on a filter which takes error models and fault data from the sensors into account, or it may include a combination of these two approaches such that the TCC can later be evaluated or re-evaluated. With this data structure it is possible for additional devices to append TCC as well as evaluations of the encapsulated TCC. For example, a second device in the same area at the same time as the first could append its own data which could either help to corroborate or contradict the original TCC. The secondary device can include such additional metrics and scores of the combined data in the appended data. Similarly, TCC services may append additional TCC or combine TCC from many sources to produce their own TCC. Additionally, subsections of TCC can selectively be chosen to propagate while others are left out although this may only be done at the TCC boundary. Note that contextual content may be selectively sampled from TCC to create derivative TCC but in this case the original TCC will have lost the signature from the original TCC producer and will have lost chain of trust back to that device. In contrast, selectively sampling TCC at TCC boundaries (contextual content and its verification data) will preserve the chain of trust back to the original TCC producing device or service.

Figure 5:
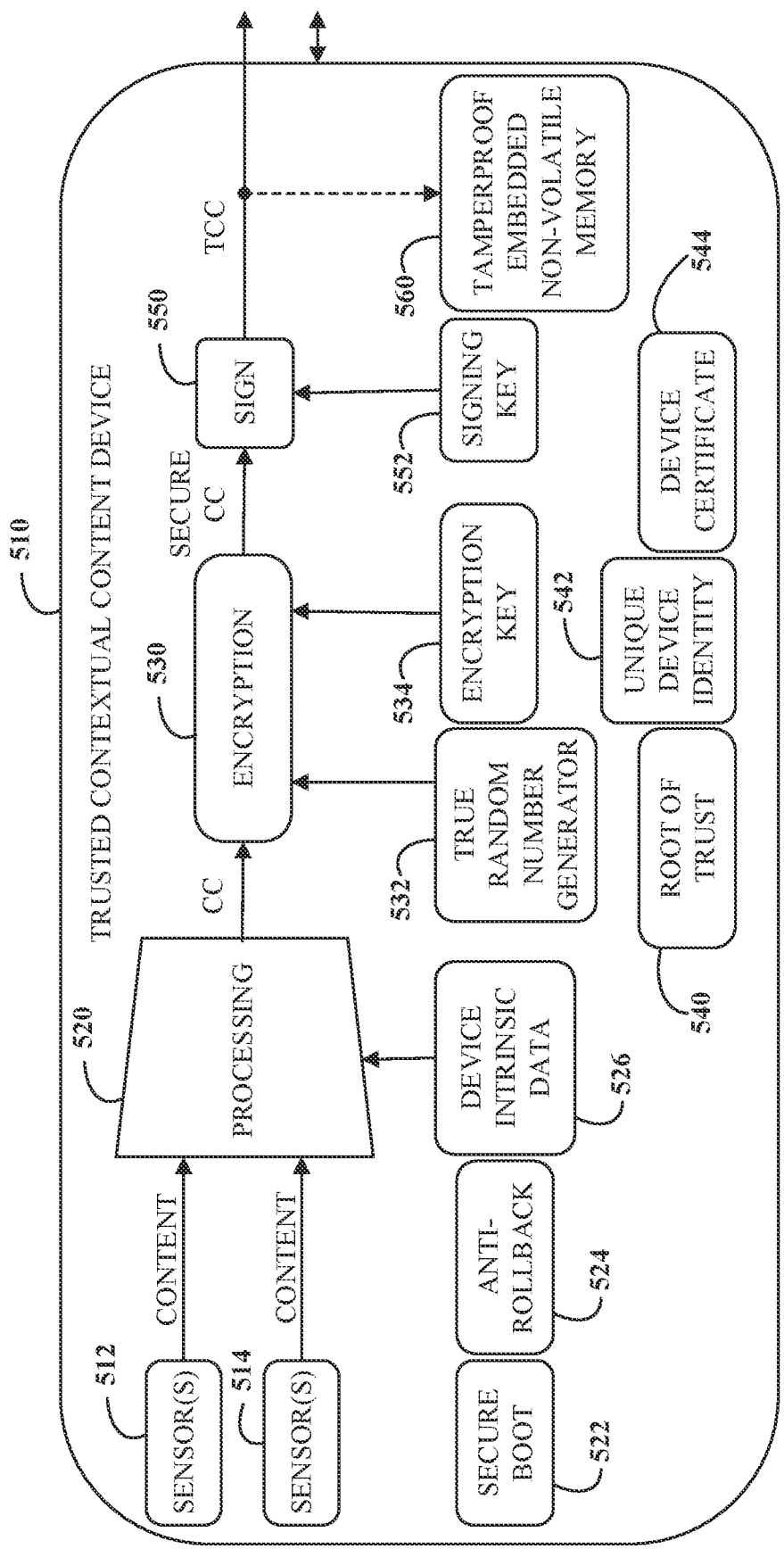
FIG. 5 is a block diagram of an example of a trusted contextual content device.

FIG. 5 is a block diagram of an example of a trusted contextual content device 510. Trusted Contextual Content Devices collect data, give the data context via referencing the data to other data & device intrinsic data (for example time, scaling parameters, and calibration parameters), process the data to create contextual content, optionally encrypt the contextual content, sign the contextual content to create TCC, optionally store that TCC, and transmit TCC over a wireless or wired interface. Wired interfaces could include USB data via USB type-C connector, wireless interfaces could include Wi-Fi, Bluetooth, 3G, 4G, LTE, and proprietary. For example, the trusted contextual content device 510 may include the device 1000 of FIG. 10.

The trusted contextual content device 510 includes one or more sensors 512 that output a first set of content and one or more sensors 514 that output a second set of content. The trusted contextual content device 510 includes a processing module 520 that applies signal processing to the content from the one or more sensors 512 and the one or more sensors 514 to generate contextual content. The contextual content may also include device intrinsic data 526 of the trusted contextual content device 510. The contextual content may be encrypted with an encryption module 530 that uses a true random number generator 532 and an encryption key 534 in order to secure the contextual content. The secure contextual content may be signed with a signing module 550 that applies a signing key 552 for the trusted contextual content device 510.

TCCDs may optionally receive TCC and or non-trusted contextual content, and or data. Such data may also be processed by the module which produces TCC. For example, a TCCD may receive secure time TCC from a secure time server on a public network via an LTE interface and use this data to reference, check, and correct the device local time. One embodiment of a TCCD may hash device intrinsic data of all of its components and include this hash in its device certificate, include it in TCC produced later, or publically publish it to a service or public ledger such that it can be audited at a later time.

The TCCD 510 includes secure boot 522, anti-rollback 524 (of bootloader, firmware, and software), a hardware True Random Number Generator (TRNG) 532 suitable for cryptographic systems, and a root of trust 540 via a root key pair. These features give the ability to later release software which increase the security and trustworthiness of the devices as well as release software patches which can fix flaws discovered in the system implementation. More importantly, note that the lack of these features prevents such ability to rely simply on software updates and may require a revision of hardware to roll out these types of improvements. These features also enable the device to produce TCC in a way such that it can be trusted by TCC consumers.

Secure boot 522 is enabled by the implementation of a secure bootloader which ensures that the firmware and software loaded by the device bootloader which is subsequently executed is the firmware and software which the manufacturer has intended. Malicious or unintended software and firmware would not execute on the TCCD. Anti-rollback 524 ensures that new bootloader, firmware, and software loaded on the TCCD are newer versions than the current version. This ensures that TCCD binaries may not be reverted to versions which have known flaws and or exploits. This enables the device manufacturer and or developer of bootloader, firmware, and software to release updates which fix flaws and exploits and assure TCCD users that the fixes are applied and cannot be removed or reverted. It also allows TCC content consumers to cross check their TCC to reduce the likelihood that it is produced by versions of TCCD bootloader, firmware, and software which do not have known flaws or exploits and invalidate, remove, or flag TCC which is not trustworthy or becomes untrustworthy after a flaw or exploit is discovered. A hardware True Random Number Generator 532 suitable for cryptographic systems is a device which can produce numbers which are statistically random and unpredictable. TRNGs are often purposefully difficult to observe and tamper with. A TRNG 532 is a vital part of creating a strong trusted system given that they may be used for key generation, encryption, signing, and cryptographic communication protocols. Utilization of the TRNG 532 in these protocols, algorithms and processes ensure that the device is further resilient to malicious attack and helps to maintain the trustworthiness of the TCC, TCCD, and its communication with other devices and infrastructure. A Root of Trust 540 may be established for a TCCD. For cryptographic systems this is typically implemented between the time of device or SoC creation and device provisioning and implemented as the creation or injection of some data which is used as the basis of the cryptographic system and is fundamental to authentication and encryption. The TCCD 510 can only be trusted as much as the process for creation or injection of the data. For a TCCD this could be implemented as a root key pair either injected by an external trusted appliance or produced by a hardware secure element internally by the TCCD 510 either by one of the TCCD manufacturer's integrated circuit vendors (at time of IC fabrication or post fabrication provisioning), or the TCCD manufacturer (at time of manufacturing or post manufacturing provisioning), or the TCCD customer (at time of provisioning of the device into a system). In the case of a trusted appliance the level of trust of such an appliance is critical since it would be possible for it to accidentally or maliciously produce different parts with the same key material. The key pair consists of a private key and a public key. These keys are used to generate various other keys for cryptographic and authentication subsystems for example an encryption key and a signing key. Additionally, a device certificate is provisioned, installed, and publicly shared with authentication authorities and or authentication communities. It is possible for each of the SoC manufacturer, TCCD manufacturer, and TCCD customer to establish a chain of trust by delegating trust to one-another. For example, the known x.509 standard defines a certificate format which allows each party to delegate trust by signing successive intermediate electronic certificates until the last player in the chain uses the intermediate certificate to provision the device certificate. This allows the authenticators to be able to reliably verify that not only the device's identity and TCC are authentic but also can trace the root of trust back to some origin using known methods. For example, a known trustworthy certificate authority (CA) owns a known trustworthy certificate. The CA may sign an intermediate certificate which it grants to an SoC manufacturer. The SoC manufacturer then manufactures SoCs and sells them to a TCCD manufacturer and also signs another cascaded intermediate certificate and grants it to the TCCD manufacturer. The TCCD manufacturer manufactures the TCCDs using the SoC as a component, establishes a root of trust on the SoC during the manufacturing process, and uses the intermediate certificate to provision a device certificate which is signed by the device. The device is sold to the TCCD customer and copies of the device certificate are published to the authentication authority and community. Later the device may be provisioned onto a network, communicate with services, and produce TCC. When other parties in the system interact with the device or its TCC they may check with the authentication authority and or community to verify not only the device's identity & TCC authenticity but also double checks that the device certificate chain is valid. This would imply that not only the device certificate is valid, but also the intermediate certificates of the TCCD manufacturer, SoC manufacturer, and the CA. Since this entire chain of trust is possible to verify it becomes very difficult to fabricate unintended roots of trust. It would require an attacker or malicious party to have to subvert not only the TCCD manufacturer, but also the SoC manufacturer, and the certificate authority. Additionally, any one of the parties in the chain of trust would be able to detect such attempts. A TCCD optionally provides functionality to have multiple users. Devices which allow multiple users implement methods for adding and removing users, authenticating users, logging in, logging out, defining and adjusting levels of permission, defining and adjusting access to specific features, defining and adjusting access to data, partitioning user data, sharing data, defining and adjusting read, write, and read-write access to data. For example, a device may have an administrative user who has the highest level of access to all data, content, and functionality on the device, a user who has access to functionality related to field TCC collection, and a user who has limited access to only transfer TCC from the device to a specific TCC service.

The secure boot 522 may include a process which detects tampering with boot loaders, key operating system files, and unauthorized option ROMs by validating their digital signatures. Detections are blocked from running before they can attack or infect the system. In the context of a secure authenticated contextual data system, secure boot 522 ensures that the binaries being executed by the system are the correct binaries which the device manufacturer has intended to execute on the device and therefor the system cannot be subverted by an attacker. It is typical that a secure boot system is a combination of hardware and software such that if either is attempted to be tampered with then the system will not run and potentially notify or alert some other system or use a user interface to indicate it to a user. A hardware hash and verification of the software image that the bootloader intends to jump to for execution may be performed. There are many know ways to implement secure boot 522 and there are many levels of security. It is good practice to verify that all versions of software and firmware on a device are compatible in systems that have software and firmware images which are comprised of multiple components The anti-rollback 524 may include hardware, software, or mixed hardware-software process or implementation which prevents executing a previous version of software on a system and therefore may only execute software which is of the current version or of a future version. Such a feature reliably detects the version of software it is executing and the software has a reliable scheme of representing it. This may be implemented with a version numbering scheme, hardware OTP, and minimally digitally signing system binaries.

The root of trust 540 may include hardware, software, or mixed hardware-software process of generating or injecting data into a device to establish a foundation for a cryptographic system. This is often implemented as generation or injection of a pair of keys, one public and one private, where the randomness, unpredictability and secrecy of the private key is fundamental for the operation of the cryptographic system. It is notable that the generation, injection, and handling of such public and private keys presents a time and place to attack such a system. For this reason, it may not be suitable to perform such operations once the system has left the care of a trusted party. Often the manufacturer is the trusted party and a verifiable chain of trust may be established to some trusted authority and or community. It is common that care is taken to secure the manufacturing facility as well as restrict and secure access to the appliances which perform these operations. Care is often taken when selecting manufacturing partners as well as geographic locations of manufacturing facilities depending on application, product, and customer requirements.

The trusted contextual content device 510 includes a unique device identity 542 and a device certificate 544.

The trusted contextual content device 510 includes a tamperproof embedded non-volatile memory 560. For example, the tamperproof embedded non-volatile memory 560 may be used to store TCC generated by the trusted contextual content device 510 locally on the trusted contextual content device 510.

Figure 6:
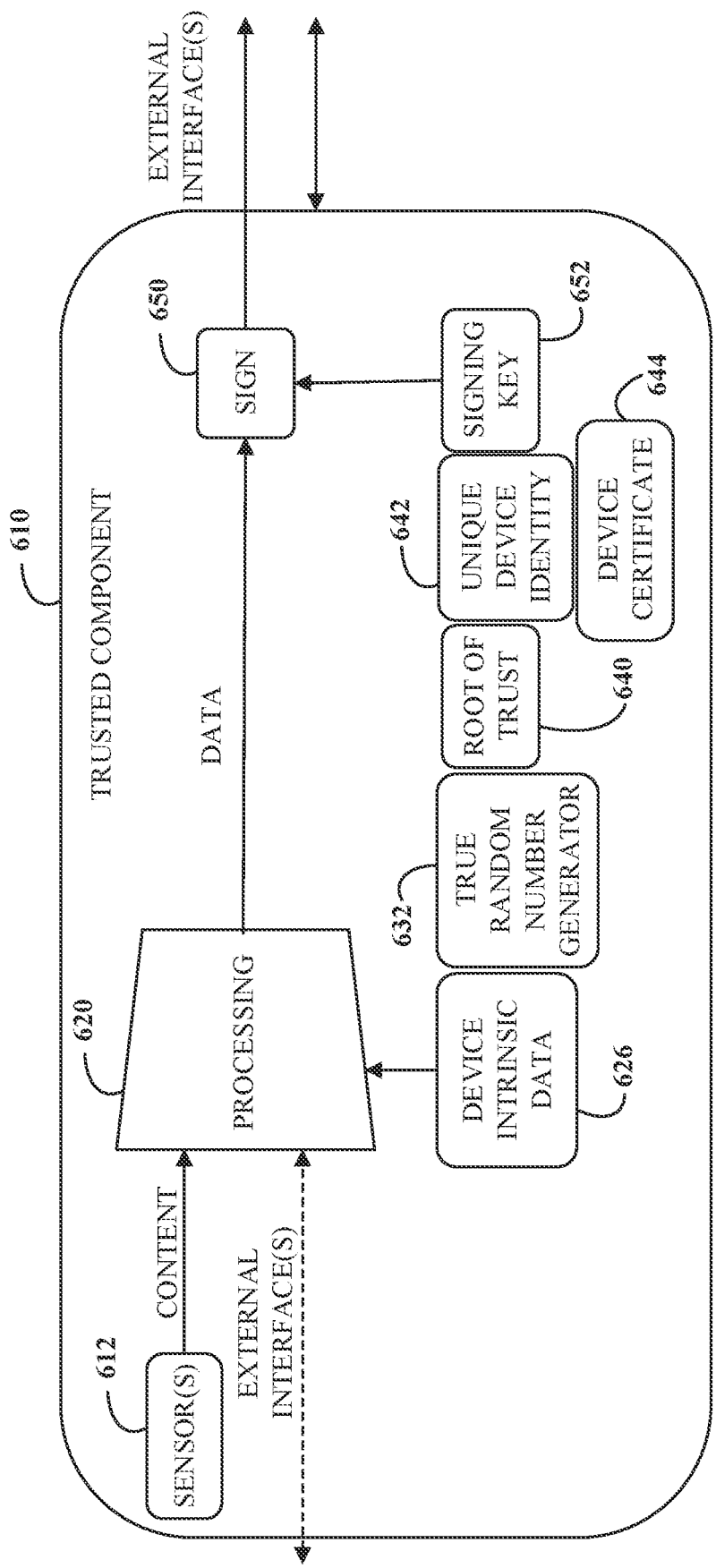
FIG. 6 is a block diagram of an example of a trusted component.

FIG. 6 is a block diagram of an example of a trusted component 610. A TCCD (e.g., the trusted contextual content device 510) may optionally have one or more trusted components. A trusted component is an intra-device part which itself has a root of trust which is cryptographically verifiable. In one embodiment of a TCCD it is possible to include the public key of all trusted components in the device in its device certificate. This helps to provide trust that the TCCD contains a specific set of components and helps to avoid devices being made with recycled or non-approved parts. It also helps to detect TCCDs which have been modified after manufacturing.

The trusted component 610 has a root of trust 640, some device intrinsic data 626 to identify itself, a processing module 620 to perform signal processing and communication and, a signing module 650, a unique signing key 652 and an external interface for communication. The trusted component 610 may optionally have one or more sensors 612 for collecting data, one or more additional non-trusted external interfaces, a TRNG 632, a unique device identity 642, and a device certificate 644. Simple trusted components may have a global signing key installed at manufacturing time which is used to sign simple messages on the external interface. An example is a trusted mechanical screw which has manufacturer name, screw lot number, screw material, screw dimensions, and screw mass as intrinsic data. It could have a wireless interface which can be queried for its intrinsic data. When it responds it uses a known digital signature algorithm (ECDSA for example) to sign the message with its signing key 652. A querying device can verify the intrinsic message using known methods to validate that the intrinsic data is correct. An embodiment of a more complex device could have a unique signing key which would prevent an attacker's ability to fake any device after maliciously breaking one device. Yet another more complex and robust embodiment of a trusted component may include a TRNG 652, unique device identity 642, and device certificate 644. Trusted components may additionally optionally encrypt data stored on the device and data communicated over the trusted interface.

Figure 7:
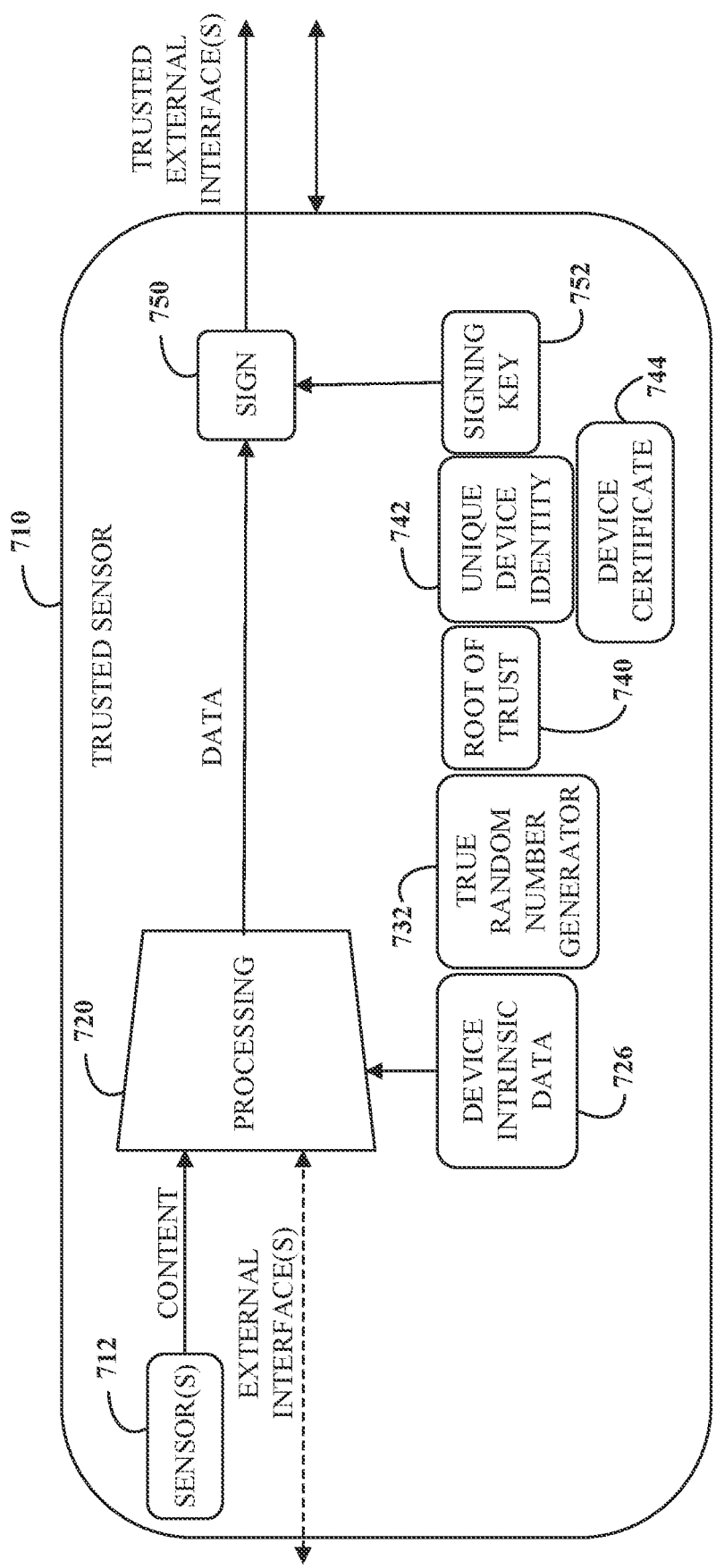
FIG. 7 is a block diagram of an example of a trusted sensor.

FIG. 7 is a block diagram of an example of a trusted sensor 710. A TCCD (e.g., the trusted contextual content device 510) may optionally include one or more trusted sensors. A trusted sensor is a trusted component that includes one or more sensors and produces data that is cryptographically authenticable. A system that interfaces with a trusted sensor may be able to authenticate that the sensor is the intended sensor. For example, if manufacturer AA produces sensor model AA-BB with unique ID AA-BB-CC, the system would be able to cryptographically query the device to validate that the sensor is indeed from AA, has model number AA-BB, and has unique ID AA-BB-CC. A trusted sensor can also optionally implement guards against physical tampering, assertion that calibration data is valid, assertion that operating and warranty conditions are met. In this way, a TCCD system architecture which utilizes trusted sensors can further guarantee that the TCC produced on the device is authentic and valid.

The trusted sensor 710 includes one or more sensors 712 (e.g., ultrasonic transducers, radio receivers, photodiodes, photodiode arrays, micro bolometers, image sensors, thermistors, GNSS receivers, accelerometers, gyroscopes, magnetometers, or pressure sensors). The trusted sensor 710 has a root of trust 740, some device intrinsic data 726 to identify itself, a processing module 720 to perform signal processing and communication for the content, a signing module 750, a unique signing key 752 and an external interface for communication. The trusted sensor 710 includes a TRNG 732, a unique device identity 742, and a device certificate 744. Simple trusted sensor may have a global signing key installed at manufacturing time which is used to sign simple messages on the external interface. An embodiment of a more complex trusted sensor could have a unique signing key 752 which would prevent an attacker's ability to fake any device after maliciously breaking one device. Yet another more complex and robust embodiment of a trusted sensor may include a TRNG 752, unique device identity 742, and device certificate 744. Trusted sensors may additionally optionally encrypt data stored on the device and data communicated over the trusted interface.

Figure 8:
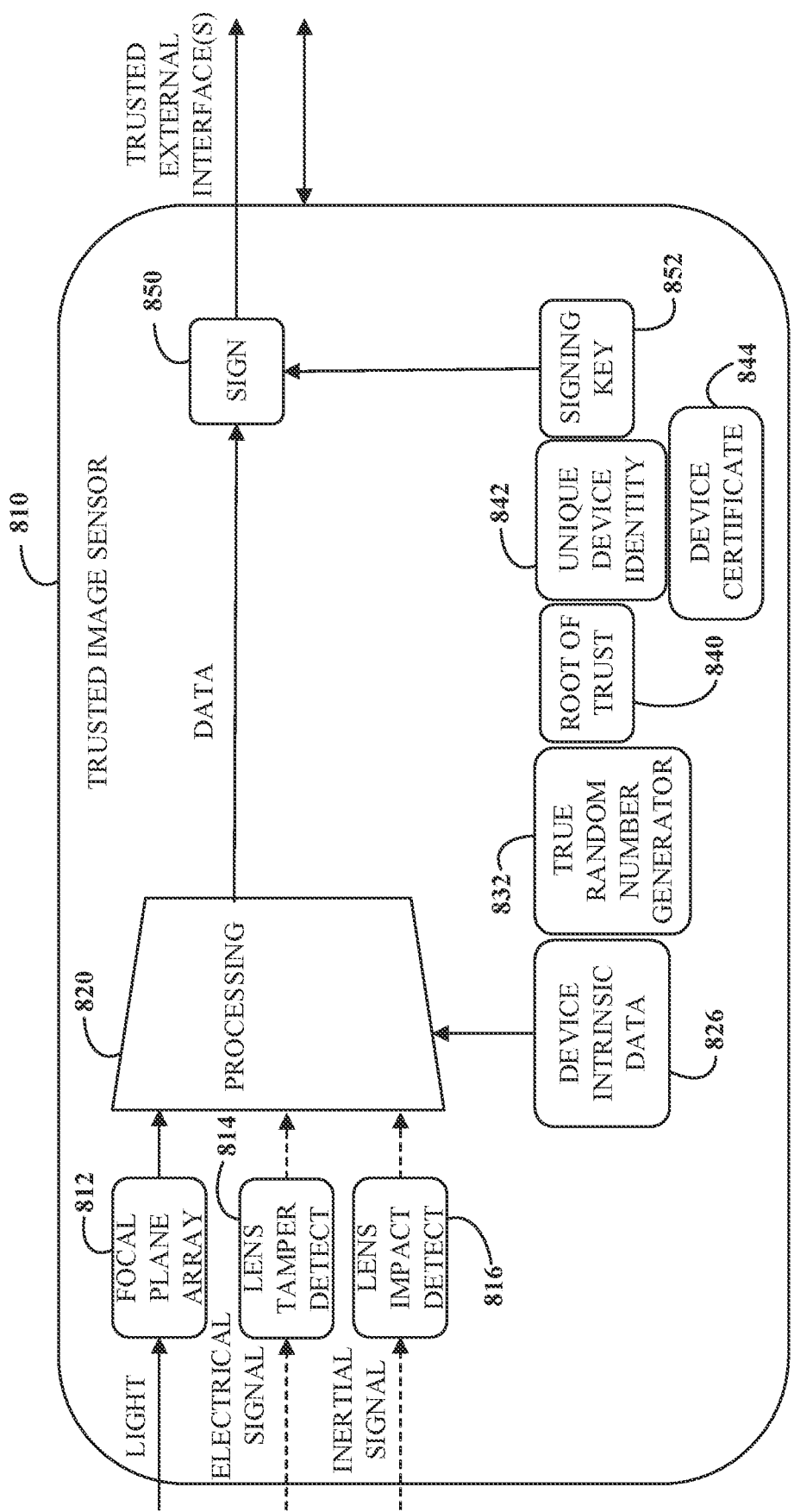
FIG. 8 is a block diagram of an example of a trusted image sensor.

An example of a trusted sensor is a trusted image sensor. FIG. 8 is a block diagram of an example of a trusted image sensor 810. The trusted image sensor 810 includes a focal plane array 812 which senses light in the visible spectrum. The trusted image sensor 810 includes a lens tamper detector 814 that is configured to detect tampering with a lens based on an electrical signal from an electrical switch sensor, which could detect if a lens has been adjusted, removed, or otherwise tampered with. The trusted image sensor 810 includes a lens impact detector 816 that is configured to detect impacts on the lens based on an inertial signal from an inertial sensor, which could detect if there was a large impact that could damage the lens or render the lens-to-sensor, lens-to-device, or sensor-to-device calibration invalid. The trusted image sensor 810 has a root of trust 840, some device intrinsic data 826 to identify itself, a processing module 820 to perform signal processing and communication for the content, a signing module 850, a unique signing key 752 and an external interface for communication. The device intrinsic data 826 may include manufacturer, manufacturing date, lot number, specific model, unique device identifier 842, sensor calibration data, lens calibration data, date of calibration, location of calibration, scalars & matrices for converting measured data into pixel data, and the device certificate 844. The trusted image sensor 810 includes a hardware TRNG 832, a root of trust 840 as an internally generated root key pair using a hardware secure module at time of manufacturing, generated a unique device identity 842, device certificate 844, and signing key 852 at manufacturing time. The trusted image sensor 810 may include a trusted external MIPI interface which transmits ECDSA signed image data to other components which can use known methods to cryptographically validate the authenticity of the data on the interface. It may have a trusted external SPI or I2C interface for command & control messages as well as reading and writing device registers. Messages on these interfaces may also be signed so that external devices can similarly validate the authenticity of the messages and register data. Register data may include the device intrinsic data 826, such as calibration data. The trusted image sensor 810 may implement processing functions which flag the image data if the sensor's lens has been tampered with or if it inertially detects that it has been dropped. In these instances, it may additionally implement processing functions that do not allow image data to be transmitted of the sensor and only allow messages that indicate that a fault or error has occurred. Often devices will reduce sensor data. For example, many imaging devices will compress image sensor data. In this case it is important to validate data from the trusted sensor before it is compressed. It would also be useful to include the trusted image sensor 810 device certificate 844 as intrinsic TCCD data which may be embedded in its TCC. This would allow TCC consumers to validate the trusted sensors as well as check for certificate revocations and other known operations.

TCCDs which include one or more trusted components and one or more trusted sensors may be able to provide cryptographically verifiable assurance that data collected by the device is valid. For example, a TCCD which includes a trusted image sensor is able to provide cryptographically verifiable TCC image data which is guaranteed to be authentic from the time light photons arrive at the trusted image sensor focal plane array. In contrast, a TCCD without a trusted image sensor could only guarantee TCC authenticity from the time that the main application processor within the device signs the data. In such systems, a faulty or tampered with image sensor may produce inadvertently flawed or maliciously fabricated image sensor data. In contrast, a typical device may not provide any assurance that its contextual content is trustworthy.

TCCDs may also attempt to increase the trustworthiness of their data by using one or more sensors to predict future contextual content values, evaluate the results, and include the results in the device TCC. This can be achieved using estimation techniques. For example, a temperature TCCD with a single temperature sensor could use linear quadratic estimation techniques to sample the sensor over time, use intrinsic data known about the sensor, for example a model for the expected error of such a sensor, and predict the next value. The predicted and actual values can be compared and used to define a quality metric for the sensor reading. Using the estimation techniques many sensors with dependent data sources can be compared to determine if one or more of the sensor data should be ignored or trusted less. For example, a system with many temperature sensors could compare all readings with some intrinsic data such as a model of how temperature should vary across the system for some given conditions to help create a metric for determining whether one or more of the sensor's data should be ignored or trusted less. Given N sensors with correlated error, the following algorithm could be used to combine the output of many sensors:

$$\begin{aligned}\text{Combined\_sensor\_value} = &(\text{Sensor\_1\_value} * \text{sensor\_1\_weight}) + \\ &(\text{Sensor\_2\_value} * \text{sensor\_2\_weight}) + \\ &\ldots + (\text{Sensor\_N\_value} * \text{sensor\_N\_weight})\end{aligned} \quad [\text{EQ 2}]$$

In the equation EQ 2 above the sensor values could optionally be normalized using some intrinsic data before they are combined. For example, calibration data, offsets, scalars, and model based corrections could be applied. In some implementations, weights can be dynamic and may be normalized to add up to exactly 1.0. If sensors have ability to detect faulty behavior or an error condition, it is possible for the weight to be adjusted to 0.0 so that the sensor values do not affect the device TCC. Given N sensors with uncorrelated error, estimation techniques may be used to combine the output of many sensors in a way to describe the local environment of the device. For example, a device with accelerometers, gyroscopes, magnetometer, barometer, GNSS, and camera would be able to use estimation techniques to produce contextual content related to the device relative to the environment for example: device absolute position relative to earth, altitude, velocity, acceleration, rotational velocity, rotational acceleration, visualization of the environment around the device, classifications of the environment, objects, beings, and things within the environment, identification of the environment, objects, beings, and things within the environment. These estimation techniques may include simultaneous localization and mapping (SLAM), classification, and tracking. These estimation techniques may produce content which describes the quality or probability that a given portion of the content is accurate. For example, the device's altitude relative to earth may be both estimated and also have a quality metric which describes the likelihood that the estimated value is accurate relative to the true value. For the example above, the GNSS system gives direct information about the device's altitude. Additionally, the barometer may give some indirect information given that it gives a differential reading as altitude changes. Additionally, the second integral of an accelerometer with respect to time gives absolute position. Additionally, a camera can give absolute position data via image processing which tracks the environment in the field of view of the camera. Similar devices may have many uncorrelated sources of data which can be processed and combined into very rich contextual content. Further, combining many trusted components which may be able to detect faults and report proper calibration further strengthens the contextual content. Secondary devices or services may append their own contextual content or contextual content from other devices as well as use similar estimation techniques to produce additional contextual content.

An example implementation of a TCCD is a TCCD Drone. A TCCD drone has sensors which collect data, intrinsic device data, data processing, optional encryption, cryptographic signing of contextual content, wireless and optionally wired external interfaces.

Figure 9:
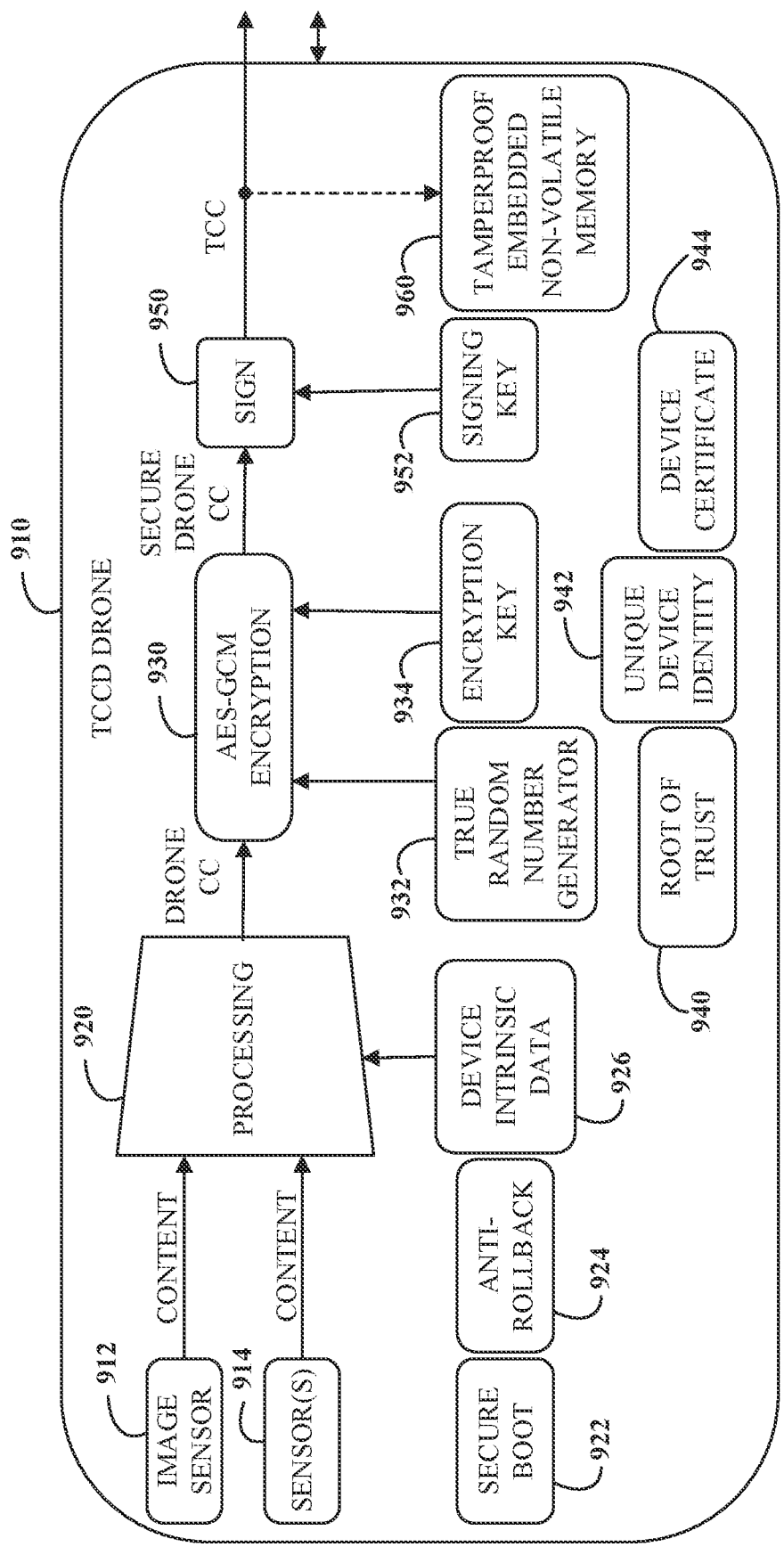
FIG. 9 is a block diagram of an example of a trusted contextual content device that is included in a drone.

FIG. 9 is a block diagram of an example of a trusted contextual content device 910 that is included in a drone. A TCCD drone 910 has sensors which capture data, including an image sensor 912 and one or more additional sensors 914. Examples of sensors could include ultrasonic transducers, radio receivers, photodiodes, photodiode arrays, micro bolometers, image sensors, crystals, time sensors, thermistors, GNSS receivers, accelerometers, gyroscopes, magnetometers, pressure sensors. Data could be and not limited to ultrasonic waves, sonic waves, radio waves, microwaves, infrared light, visible light, ultraviolet light, ionizing radiation, time, ambient temperature, geographic location, heading, velocity, acceleration, and barometric pressure which become content when referenced to time, device intrinsic data 926, calibration data, and or other data, content, and contextual content received by the TCCD drone 910. Examples of intrinsic device data 626 are unique device identifier 942, parameters, sensor calibration data, and other device unique data which is stored on the device. Other examples are device model number, scaling and conversion parameters for converting sensor data into content, conversion parameters, arrays, and matrices to assist processing of various content into contextual content. Such data can be unique to the device, measured and stored by on-board sensors, stored in device specific software, stored in device model specific software, recorded as part of a factory or user calibration set, and or manually entered at factory, provisioning, or by the user. The contextual content is processed by a processing module 920 to create contextual content, the contextual content is optionally encrypted using an AES-GCM encryption module 930. The contextual content signed with the signing module 950 using the signing key 952. The signed data is optionally stored and transmitted via wireless and/or optional wired external interface. The TCCD drone 910 implements hardware based secure boot 922 and anti-rollback 924. The hardware based secure boot 922 may use hardware functionality to compute and verify a hash of the device software. The TCCD drone 910 has a hardware TRNG 932 in its main application processor. The main application processor may be provisioned with a root key pair by the main application processor IC vendor. The manufacturer may optionally provision the device at manufacturing time by establishing a root of trust 940, utilizing the device's hardware security module to generate a key pair and derivative keys, generates a device certificate 944 which is derived from the manufacturer's intermediate certificate which has a chain of trust that can be followed back to a trusted certificate authority or community of trusted authenticators, has the device sign the device certificate 944, stores the signed certificates on the device, and registers the device certificate 944 with the authentication authority and or community. There is a wireless and optionally wired API for the TCCD customer to optionally provision the device. Encryption of TCC as well as other device data is optionally implemented. An example implementation is hardware AES-GCM. Signing of TCC is implemented. An example implementation is hardware based ECDSA. The TCCD drone 910 optionally stores TCC in an embedded or removable non-volatile memory 960. The memory 960 may additionally be tamperproof & physically secure to further improve security. The external wireless interface could be implemented as a Wi-Fi radio with 802.11 protocol and or custom proprietary protocol, 3G, 4G, or LTE radio and the wired interface could be USB Type-C connector with USB protocol, other standard wireless protocols, and or custom proprietary protocols and connectors.

This architecture can be applied to many different TCCDs, Service Providers, and TCC Consumers. For example, TCCDs could be mountable cameras, wearable cameras, dash cameras, connected sensors such as a thermometer, robotic devices such as ground robot, humanoid, multi-legged robot, wheeled robot, autonomous car, autonomous surface vessel, and drones such as Multirotor, VTOL, fixed wing, and helicopter. Service providers could include TCC analytics, AI processing, image processing, media transcoding, storage, backup, compression, format translation, routing as well as providing localization data, TCC from other TCCDs, and non trusted data and, content, and contextual content. TCC consumers could be consumers, organizations which own and or operate TCCDs, and organizations which rely on TCC data from other TCCDs which they do not own and or operate.

Figure 10:
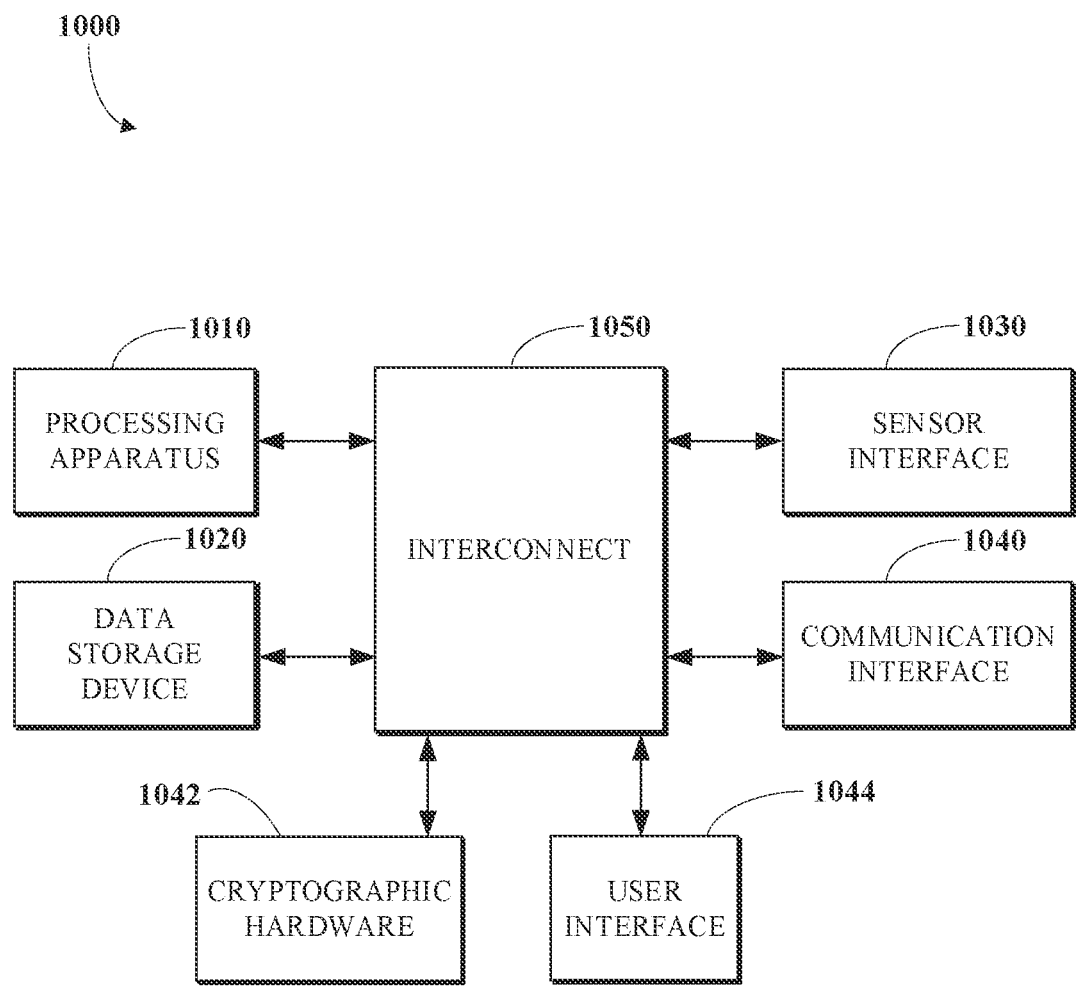
FIG. 10 is a block diagram of an example of a hardware configuration for a device.

FIG. 10 is a block diagram of an example of a hardware configuration for a device 1000. The hardware configuration may include a data processing apparatus 1010, a data storage device 1020, a sensor interface 1030, a controller interface 1040, a user interface 1044, and an interconnect 1050 through which the data processing apparatus 1010 may access the other components. For example, the device 1000 may be or be part of a trusted contextual content device (e.g., the trusted contextual device 110, the trusted contextual device 112, or the trusted contextual device 510). For example, the device 1000 may be or be part of a trusted contextual content consumer device (e.g., the trusted contextual content consumer device 120). For example, the device 1000 may be or be part of a trusted contextual content service provider device (e.g., the trusted contextual content service provider device 150). The device 1000 may be configured to generate, augment, and/or present trusted contextual content. For example, the device 1000 may be configured to implement the process 1100 of FIG. 11, the process 1200 of FIG. 12, the process 1300 of FIG. 13, and/or the process 1400 of FIG. 14.

The data processing apparatus 1010 is operable to execute instructions that have been stored in a data storage device 1020. In some implementations, the data processing apparatus 1010 is a processor with random access memory for temporarily storing instructions read from the data storage device 1020 while the instructions are being executed. The data processing apparatus 1010 may include single or multiple processors each having single or multiple processing cores. Alternatively, the data processing apparatus 1010 may include another type of device, or multiple devices, capable of manipulating or processing data. For example, the data storage device 1020 may be a non-volatile information storage device such as a hard drive, a solid-state drive, a read-only memory device (ROM), an optical disc, a magnetic disc, or any other suitable type of storage device such as a non-transitory computer readable memory. The data storage device 1020 may include another type of device, or multiple devices, capable of storing data for retrieval or processing by the data processing apparatus 1010. The data processing apparatus 1010 may access and manipulate data stored in the data storage device 1020 via interconnect 1050. For example, the data storage device 1020 may store instructions executable by the data processing apparatus 1010 that upon execution by the data processing apparatus 1010 cause the data processing apparatus 1010 to perform operations (e.g., operations that implement the process 1100 of FIG. 11, the process 1200 of FIG. 12, the process 1300 of FIG. 13, and/or the process 1400 of FIG. 14).

The sensor interface 1030 may be configured to control and/or receive data (e.g., temperature measurements, pressure measurements, a lidar point cloud, acceleration measurements, angular rate measurements, magnetic flux measurements, and/or a visible spectrum image) from one or more sensors (e.g., the one or more sensors 512). In some implementations, the sensor interface 1030 may implement a serial port protocol (e.g., I2C or SPI) for communications with one or more sensor devices over conductors. In some implementations, the sensor interface 1030 may include a wireless interface for communicating with one or more sensor groups via low-power, short-range communications (e.g., using a body area network protocol or a vehicle area network protocol).

The communications interface 1040 facilitates communication with other devices, for example, another trusted contextual content device (e.g., the drone 210). For example, the communications interface 1040 may include a wireless interface, which may facilitate communication via a Wi-Fi network, a Bluetooth link, or a ZigBee link. For example, the communications interface 1040 may include a wired interface, which may facilitate communication via a serial port (e.g., RS-232 or USB). The communications interface 1040 facilitates communication via a network (e.g., the network 230).

The user interface 1044 allows input and output of information from/to a user. In some implementations, the user interface 1044 can include a display, which can be a liquid crystal display (LCD), a cathode-ray tube (CRT), a light emitting diode (LED) display (e.g., an OLED display), or other suitable display. For example, the user interface 1044 may include a touchscreen. For example, the user interface 1044 may include a head-mounted display (e.g., virtual reality goggles or augmented reality glasses). For example, the user interface 1044 may include a positional input device, such as a mouse, touchpad, touchscreen, or the like; a keyboard; or other suitable human or machine interface devices.

For example, the interconnect 1050 may be a system bus, or a wired or wireless network (e.g., a vehicle area network). In some implementations (not shown in FIG. 10), some components of the device 1000 may be omitted, such as the sensor interface 1030 or the user interface 1044.

Figure 11:
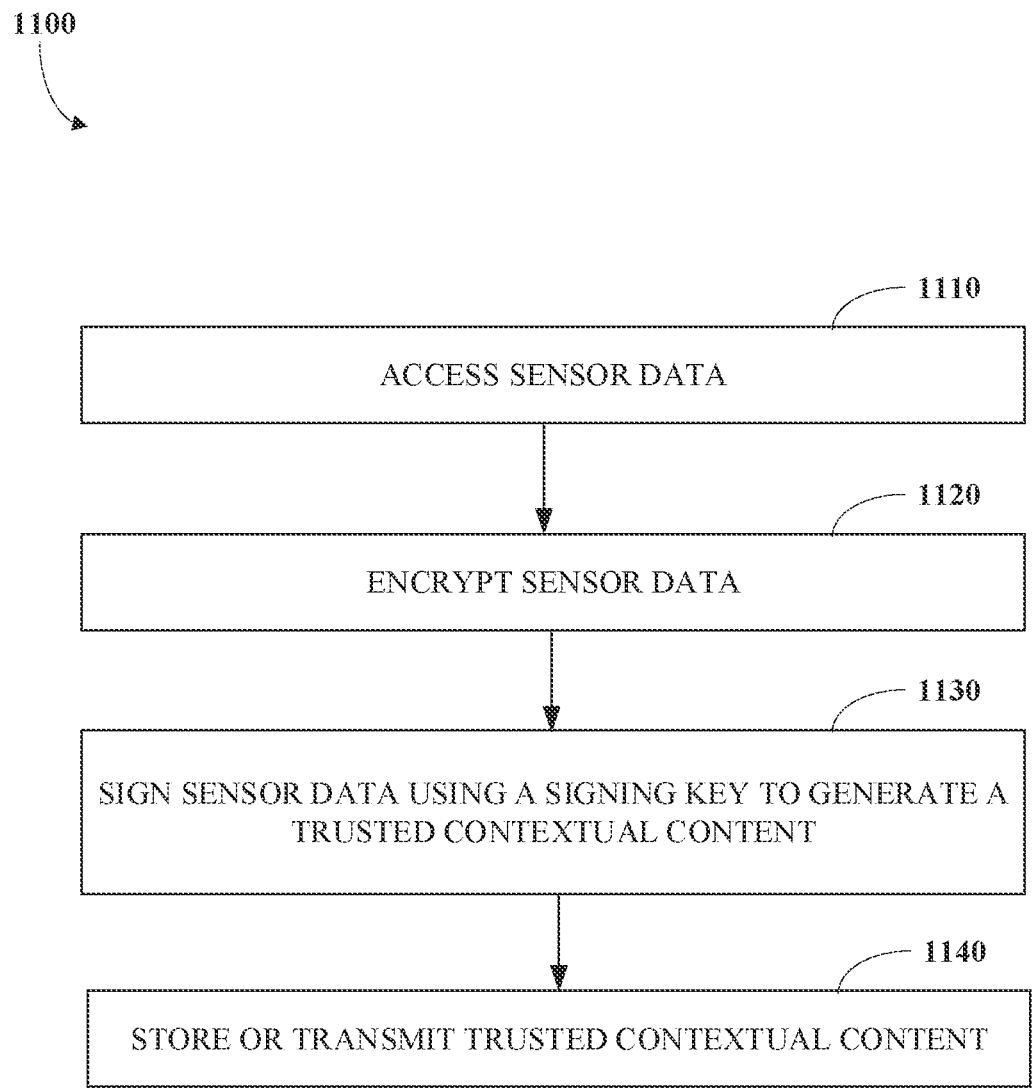
FIG. 11 is a flowchart of an example of a process for generating trusted contextual content.

FIG. 11 is a flowchart of an example of a process 1100 for generating trusted contextual content. The process 1100 includes accessing 1110 sensor data from one or more sensors; encrypting 1120 the sensor data; signing 1130 the sensor data using a signing key to generate a trusted contextual content; and storing or transmitting 1140 the trusted contextual content. For example, the process 1100 may be implemented by a trusted contextual content device, such as the trusted contextual content device 112 of FIG. 1, the trusted contextual content device 510 of FIG. 5, or the trusted contextual content device drone 910 of FIG. 9. For example, the process 1100 may be implemented by a trusted component, such as the trusted component 610 of FIG. 6. For example, the process 1100 may be implemented by a trusted sensor, such as the trusted sensor 710 of FIG. 7. For example, the process 1100 may be implemented by a trusted image sensor, such as the trusted image sensor 810 of FIG. 8. For example, the process 1100 may be implemented by the device 1000 of FIG. 10.

The process 1100 includes accessing 1110 sensor data from one or more sensors (e.g., the one or more sensors 512 or the one or more sensors 612). For example, the sensor data may include temperature measurements, pressure measurements, a lidar point cloud, acceleration measurements, angular rate measurements, magnetic flux measurements, an infrared image, and/or a visible spectrum image. The sensor data may provide information about the state of an environment in the vicinity of a trusted contextual content device that includes the one or more sensors. In some implementations, the one or more sensors may be components of a vehicle (e.g., an autonomous vehicle). In some implementations, the one or more sensors may be components of a drone (e.g., the drone 210). In some implementations, the one or more sensors are part of a trusted component (e.g., the trusted sensor 710). The sensor data may be accessed 1110 in variety of ways. For example, the sensor data may be accessed 1110 by reading directly from a sensor via a sensor interface (e.g., the sensor interface 1030) or from a memory (e.g., the storage device 1020) via an interconnect (e.g., the interconnect 1050).

The process 1100 includes encrypting the sensor data prior to signing the sensor data. For example, the sensor data may be encrypted using an encryption module (e.g., the encryption module 530) with an encryption key (e.g., the encryption key 534). For example, the sensor data may be encrypting 1120 using Advanced Encryption Standard (AES) encryption.

The process 1100 includes signing 1130 the sensor data using a signing key to generate a trusted contextual content including a digital signature. For example, the sensor data may be signed 1130 using a digital signature algorithm, such as Elliptic Curve Digital Signature Algorithm (ECDSA). For example, the signing key (e.g., the signing key 552 or the signing key 752) may be associated with a trusted contextual content device or a trusted sensor within a trusted contextual content device. In some implementations, sensor data captured by a trusted sensor is signed 1130 with a signing key of the trusted sensor to generate a trusted contextual content including a digital signature associated with the trusted sensor.

The process 1100 includes storing or transmitting 1140 the trusted contextual content. For example, the trusted contextual content may be stored 1140 in memory of the processing apparatus 1010 or the storage device 1020. For example, the trusted contextual content may be transmitted 1140 using the communications interface 1040. For example, the trusted contextual content may be transmitted 1140 via the network 130 or via the wireless communications link 114.

In some implementations (not shown in FIG. 11), the process 1100 may be modified to add, reorder, or omit steps described above. For example, data may be signed 1130 without encrypting 1120 the sensor data or the sensor data may be signed 1130 and then encrypted along with the digital signature.

Figure 12:
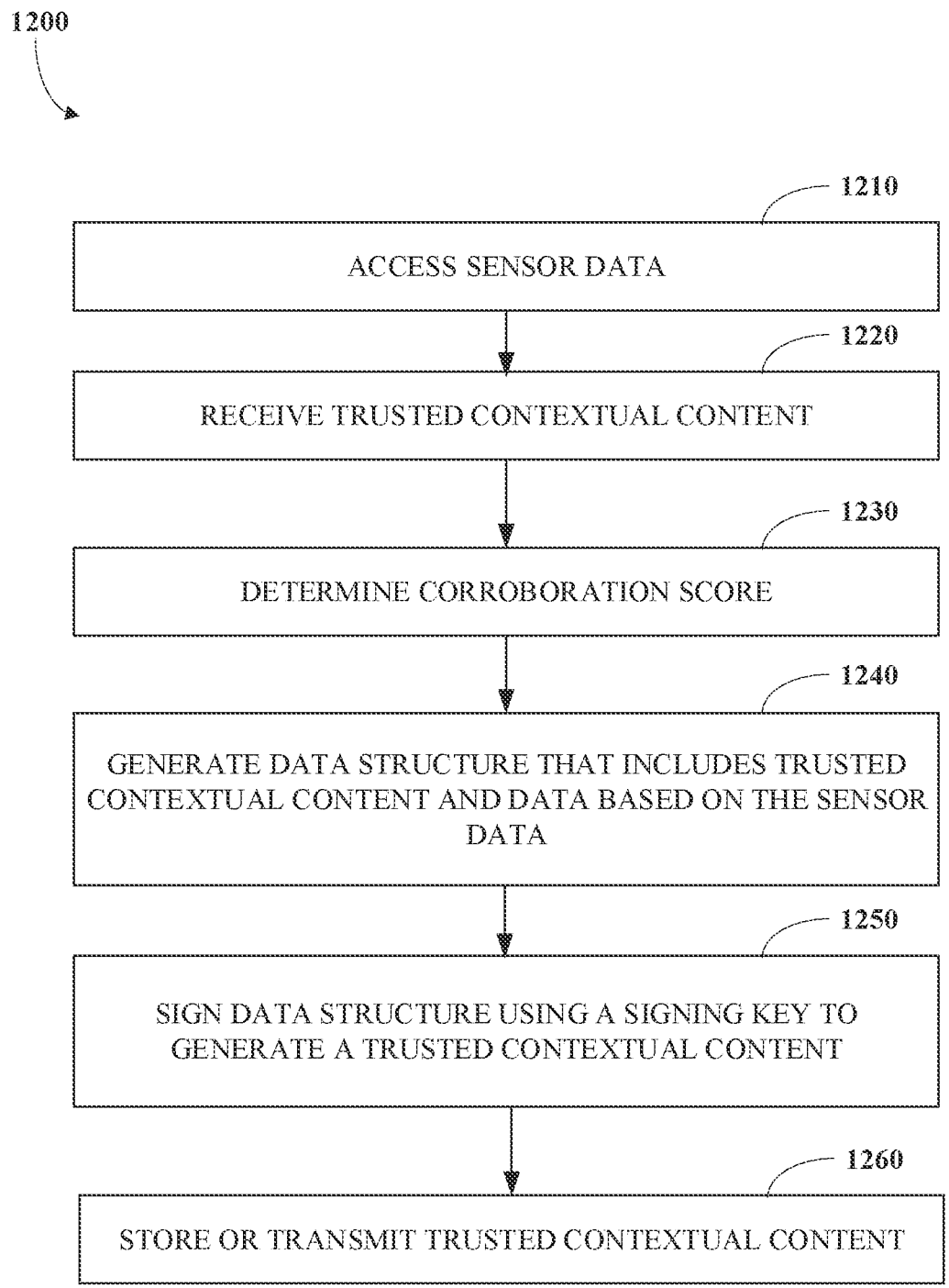
FIG. 12 is a flowchart of an example of a process for generating trusted contextual content with sensor data from multiple sources.

FIG. 12 is a flowchart of an example of a process 1200 for generating trusted contextual content with sensor data from multiple sources. Incorporating sensor data from multiple sources in trust contextual content may provide more complete and/or reliable information about the state of an environment. The process 1200 includes accessing 1210 a first set of sensor data from one or more sensors; receiving 1220, a first trusted contextual content that includes a first digital signature; determining 1230 a corroboration score by comparing sensor data from the first trusted contextual content to sensor data from the first set of sensor data; generating 1240 a data structure including the first trusted contextual content and data based on the first set of sensor data; signing 1250 the data structure using a signing key to generate a second trusted contextual content including a second digital signature; and storing or transmitting 1260 the second trusted contextual content. For example, the process 1200 may be implemented by a trusted contextual content device, such as the trusted contextual content device 112 of FIG. 1, the drone controller 212 of FIG. 2, the trusted contextual content device 510 of FIG. 5, or the trusted contextual content device drone 910 of FIG. 9. For example, the process 1200 may be implemented by the device 1000 of FIG. 10.

The process 1200 includes accessing 1210 a first set of sensor data from one or more sensors (e.g., the one or more sensors 512 or the image sensor 912). For example, the sensor data may include temperature measurements, pressure measurements, a lidar point cloud, acceleration measurements, angular rate measurements, magnetic flux measurements, an infrared image, and/or a visible spectrum image. The sensor data may provide information about the state of an environment in the vicinity of a trusted contextual content device that includes the one or more sensors. In some implementations, the one or more sensors may be components of a vehicle (e.g., an autonomous vehicle). In some implementations, the one or more sensors may be components of a drone (e.g., the drone 210). For example, the one or more sensors may include an image sensor (e.g., the image sensor 912) and the first set of sensor data may include image data. In some implementations, the one or more sensors include a trusted sensor (e.g., the trusted sensor 710) and the first set of sensor data includes trusted contextual content from the trusted sensor that includes a digital signature of the trusted sensor. The sensor data may be accessed 1210 in variety of ways. For example, the sensor data may be accessed 1210 by reading directly from a sensor via a sensor interface (e.g., the sensor interface 1030) or from a memory (e.g., the storage device 1020) via an interconnect (e.g., the interconnect 1050).

The process 1200 includes receiving 1220, a first trusted contextual content that includes a first digital signature. The first trusted contextual content may be received 1220 from another trusted contextual content device. For example, first trusted contextual content may be received 1220 from a drone (e.g., the drone 210). For example, first trusted contextual content may be received 1220 by a drone controller (e.g., the drone controller 212). For example, the one or more sensors and a processing apparatus implementing the process 1200 may be components of a remote controller (e.g., the drone controller 212) for the drone. In some implementations, the first trusted contextual content is received 1220 by a drone from another drone. For example, the first trusted contextual content may be received 1220 using the communications interface 1040.

The first trusted contextual content may include sensor data for a region near or overlapping with a region with condition reflected in the first set of sensor data from the one or more sensors of the receiving 1220 device. The first set of sensor data and sensor data from the first trusted contextual content may jointly provide a diversity of sensor data about a region that provides more information about the state of the region and these two sets of sensor data may also provide redundant information about a region that can be used for corroboration. There may be an expected relationship between values of these two sets of sensor data. For example, two drones flying near one another may be expected to measure similar temperatures and pressures and to capture images showing objects in shared field of view appearing at the same locations at the same times. For example, a drone (e.g., the drone 210) flying at a known altitude may be expected to measure a temperature and pressure that are related to a temperature and pressure measured by an associated drone controller (e.g., the drone controller 212) on located on the ground nearby.

The process 1200 includes determining 1230 a corroboration score by comparing sensor data from the first trusted contextual content to sensor data from the first set of sensor data. For example, a corroboration score may be determined 1230 based on a difference or a squared difference between sensor measurements of the same type from the two sources. For example, a corroboration score may be determined 1230 based on a difference or a squared difference between a sensor measurement from the first trusted contextual content and an expected value that is determined based on the first set of sensor data.

The process 1200 includes generating 1240 a data structure including the first trusted contextual content and data based on the first set of sensor data. For example, the data based on the first set of sensor data may include a copy of the raw sensor data. In some implementations, signal processing is applied to the first set of sensor to determine the data based on the first set of data that is included in the data structure. For example, the data based on the first set of sensor data may include the corroboration score. For example, the data structure may be generated 1240 to include the corroboration score. The data structure may be similar to a data structure described in relation to the memory maps of FIGS. 3 and 4. The data structure may append the data based on the first set of sensor data to the first trusted contextual content, including the first digital signature from another device.

The process 1200 includes signing 1250 the data structure using a signing key to generate a second trusted contextual content including a second digital signature (e.g., a digital signature of a device implementing the process 1200). For example, the data structure may be signed 1250 using a digital signature algorithm, such as Elliptic Curve Digital Signature Algorithm (ECDSA). For example, the signing key (e.g., the signing key 552 or the signing key 952) may be associated with a trusted contextual content device (e.g., the drone controller 212).

The process 1200 includes storing or transmitting 1260 the second trusted contextual content. For example, the second trusted contextual content may be stored 1260 in memory of the processing apparatus 1010 or the storage device 1020. For example, the second trusted contextual content may be transmitted 1260 using the communications interface 1040. For example, the second trusted contextual content may be transmitted 1260 via the network 130 or via the communications link 134.

In some implementations (not shown in FIG. 12), the process 1200 may be modified to add, reorder, or omit steps described above. For example, data based on the first set of sensor data may be encrypted prior to being included in the data structure that is signed 1250. For example, determining 1230 the corroboration score may be omitted.

Figure 13:
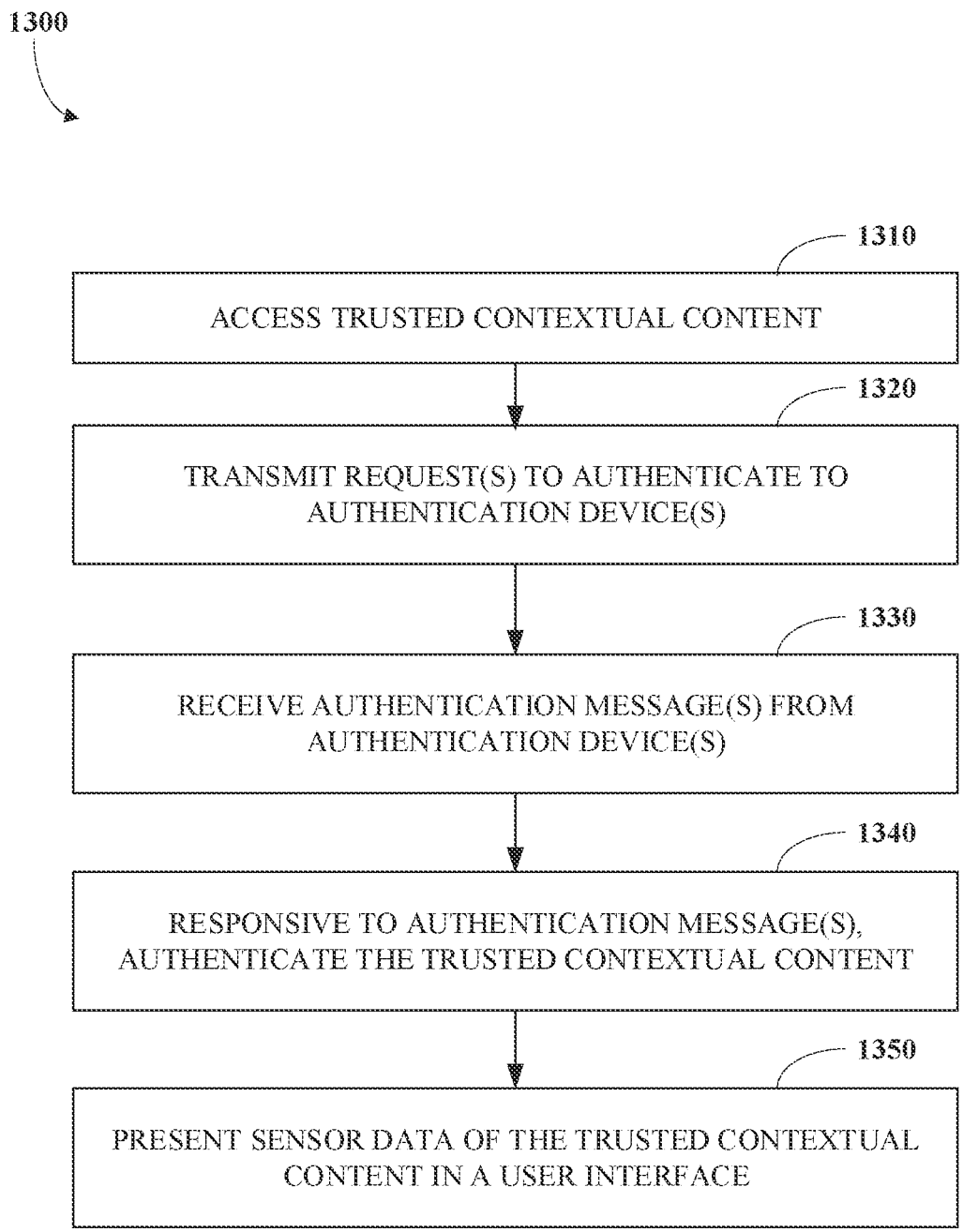
FIG. 13 is a flowchart of an example of a process for presenting trusted contextual content.

FIG. 13 is a flowchart of an example of a process 1300 for presenting trusted contextual content. The process 1300 includes accessing 1310 trusted contextual content; transmitting 1320 one or more requests to authenticate the trusted contextual content to one or more authentication devices; receiving 1330 one or more authentication message(s) from the one or more authentication devices; and, responsive to the one or more authentication messages, presenting 1340 the sensor data in a user interface. For example, the process 1300 may be implemented by a trusted contextual content consumer device, such as the trusted contextual content consumer device 120 of FIG. 1. For example, the process 1300 may be implemented by the device 1000 of FIG. 10.

The process 1300 includes accessing 1310 a trusted contextual content. The trusted contextual content may be accessed 1310 in variety of ways. For example, the trusted contextual content may be accessed 1310 by receiving the trusted contextual content directly from a trusted contextual content device (e.g., from the trusted contextual content device 112 via the communications link 124). For example, the trusted contextual content may be accessed 1310 by receiving the trusted contextual content via a network (e.g., the network 130). For example, the For example, the trusted contextual content may be accessed 1310 by receiving the trusted contextual content may be stored by a service (e.g., the one or more services 132 or the one or more services 136) available through the network. In some implementations, the trusted contextual content is stored locally. For example, the trusted contextual content may be accessed 1310 by reading the trusted contextual content from a memory (e.g., the storage device 1020) via an interconnect (e.g., the interconnect 1050).

The process 1300 includes transmitting 1320 a request to authenticate the trusted contextual content to an authentication device. In some implementations, the authentication device is part of a centralized authentication authority (e.g., a device of the centralized authentication authority device 140). In some implementations, the authentication device is part of a decentralized authentication community (e.g., a device of the decentralized authentication community 144). For example, the request may be transmitted using the communications interface 1040 via the network 130. In some implementations, the request includes a copy of the trusted contextual content or a portion of the trusted contextual content. In some implementations, the request includes a link or other pointer to the trusted contextual content. In some implementations, multiple requests for authentication are transmitted 1320 to multiple authentication devices. For example, one or more additional requests to authenticate the trusted contextual content may be transmitted 1320 to the one or more additional authentication devices (e.g., one or more additional authentication devices that are part of the decentralized authentication community 144).

The process 1300 includes receiving 1330 an authentication message from the authentication device. For example, the authentication message may be received 1330 using the communications interface 1040 via the network 130. In some implementations, the authentication message includes a binary indication of whether or not the trusted contextual content is reliable. In some implementations, the authentication message includes an authentication metric indicating a degree to which the trusted contextual content is estimated to be reliable. In some implementations, multiple authentication messages are received 1330 from multiple authentication devices. For example, the authentication message and the one or more additional authentication messages from the one or more additional authentication devices may include respective authentication metrics. For example, the process 1300 may include determining a weighted average of the respective authentication metrics.

The process 1300 includes, responsive to the authentication message received from the authentication device, presenting 1340 sensor data of the trusted contextual content in a user interface (e.g., the user interface 1044). In some implementations, where multiple authentication requests are transmitted 1320, the process 1300 includes, responsive to the one or more additional authentication messages received from the one or more additional authentication devices, presenting 1340 the sensor data in a user interface. For example, a weighted average of the respective authentication metrics from the authentication devices may be determined and presented 1340 with the sensor data in the user interface to facilitate evaluation of the sensor data. For example, a weighted average of the respective authentication metrics from the authentication devices may be determined and compared to threshold. In some implementations, the sensor data is presented 1340 only if the weighted average of authentication metrics exceeds the threshold.

For example, the trusted contextual content may include sensor data captured by multiple devices, corroboration scores or other metadata (e.g., generated using the process 1400 of FIG. 14), and multiple digital signatures from devices in a chain of custody for the sensor data. In some implementations, an authentication metric is based on multiple digital signatures from devices in a chain of custody for sensor data. In some implementations, multiple authentication metrics are determined for sensor data from respective trusted contextual content devices that are included in the trusted contextual content.

Figure 14:
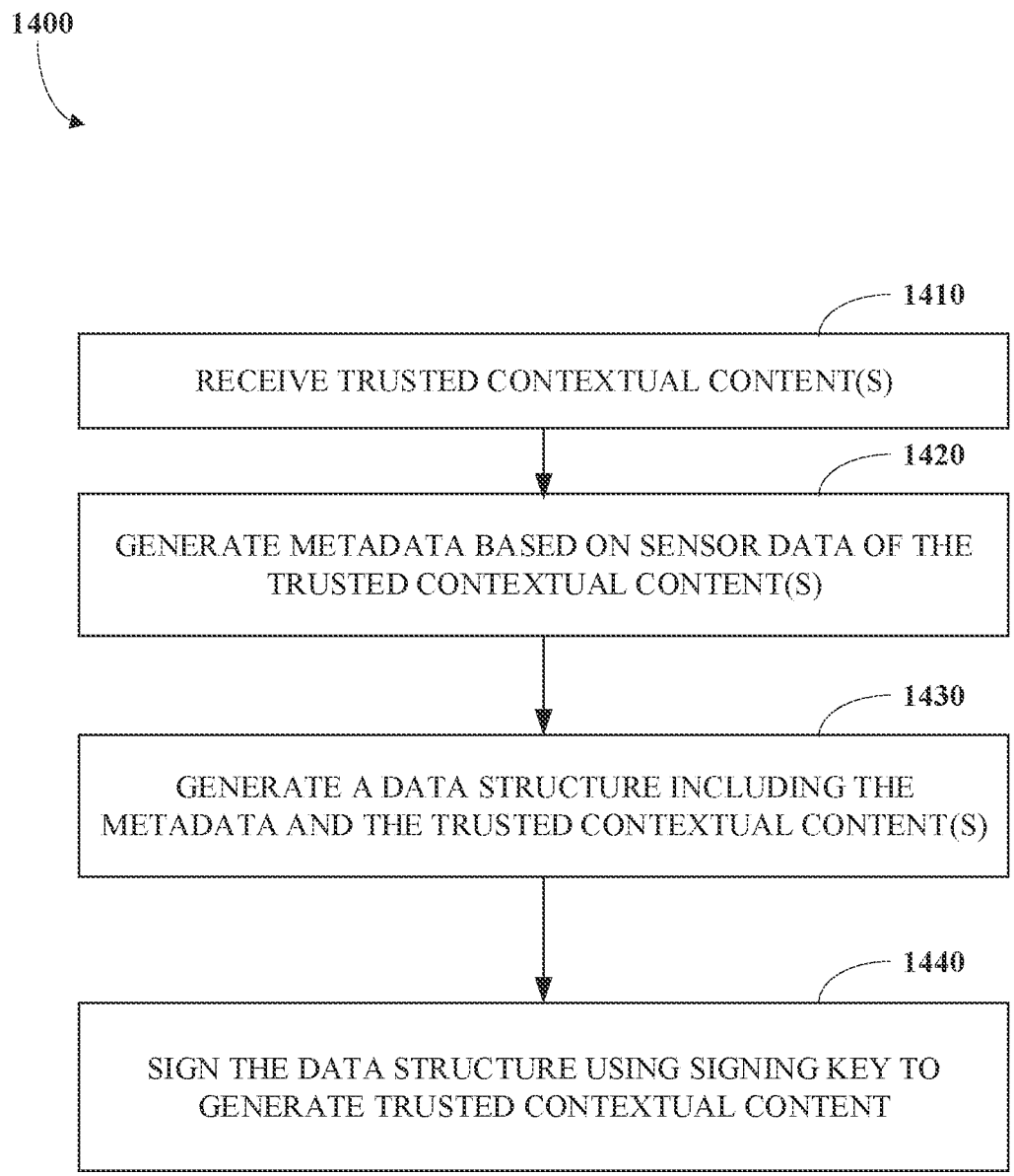
FIG. 14 is a flowchart of an example of a process for augmenting trusted contextual content.

FIG. 14 is a flowchart of an example of a process 1400 for augmenting trusted contextual content. The process 1400 includes receiving 1410 a first trusted contextual content; generating 1420 metadata based on sensor data of the trusted contextual content; generating 1430 a data structure including the metadata and the trusted contextual content; and signing 1440 the data structure using a signing key to generate a second trusted contextual content including a second digital signature. For example, the process 1400 may be implemented by a trusted contextual content service provider device, such as the trusted contextual content service provider device 150 of FIG. 1. For example, the process 1400 may be implemented by the device 1000 of FIG. 10.

The process 1400 includes receiving a first trusted contextual content. The first trusted contextual content includes a first digital signature. For example, the first trusted contextual content may be received from a trusted contextual content device (e.g., the trusted contextual content device 112, the drone 210, or the drone controller 212).

The process 1400 includes generating 1420 metadata based on the sensor data of the first trusted contextual content. For example, the sensor data may include image data and the metadata may include object detection and/or classification data generated 1420 by inputting the image data to an image classifier (e.g., including a convolutional neural network). In some implementations, sensor data from multiple trusted contextual contents may be combined to generate 1420 metadata. For example, trusted contextual contents from multiple drones may be correlated based on position and orientation data in their respective sensor data and image data from the drones may be analyzed to identify inconsistencies in the data and/or to corroborate the data from multiple sources. For example, a third trusted contextual content may be received 1310 that is signed by another trusted contextual content device, and the metadata may be generated 1320 based on the sensor data of the third trusted contextual content, wherein the metadata includes a corroboration score that is determined based on comparison of the sensor data of the first trusted contextual content to the sensor data of the third trusted contextual content.

The process 1400 includes generating 1430 a data structure including the metadata and the first trusted contextual content. The data structure may be similar to a data structure described in relation to the memory maps of FIGS. 3 and 4. The data structure may append the metadata to the first trusted contextual content, including the first digital signature from another device.

The process 1400 includes signing 1440 the data structure using a second signing key to generate a second trusted contextual content including a second digital signature (e.g., a digital signature of a trusted contextual content service provider device). For example, the data structure may be signed 1440 using a digital signature algorithm, such as Elliptic Curve Digital Signature Algorithm (ECDSA). For example, the signing key may be associated with a trusted contextual content service provider device (e.g., the trusted contextual content service provider device 150).

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system comprising:
   one or more sensors configured to capture sensor data responsive to input from a physical environment, wherein the one or more sensors are components of a remote controller for a drone;
   a processing apparatus configured to:
      generate a data structure including a first trusted contextual content and a first set of sensor data of the sensor data; and
      sign the data structure using a signing key to generate a second trusted contextual content.

2. The system of claim 1, wherein the processing apparatus is configured to:
   receive the first set of sensor data from the one or more sensors; and
   store or transmit the second trusted contextual content.

3. The system of claim 1, wherein the first trusted contextual content includes a first digital signature and the second trusted contextual content includes a second digital signature.

4. The system of claim 1, wherein the processing apparatus is configured to:
   determine a corroboration score by comparing the first trusted contextual content to the first set of sensor data, wherein the data structure includes the corroboration score.

5. The system of claim 1, wherein the processing apparatus is configured to:
   receive the first trusted contextual content from the drone.

6. The system of claim 1, wherein the one or more sensors and the processing apparatus are components of a drone.

7. The system of claim 1, wherein the one or more sensors include an image sensor and the first set of sensor data includes image data.

8. The system of claim 1, wherein the one or more sensors include a trusted sensor that is configured to:
   sign sensor data captured by the trusted sensor with a signing key of the trusted sensor to generate a third trusted contextual content including a third digital signature, and wherein the first set of sensor data includes the third trusted contextual content.

9. The system of claim 1, wherein the data structure includes device intrinsic data comprising data identifying a device that includes the one or more sensors.

10. The system of claim 1, comprising:
    the drone comprising a trusted contextual content device including one or more sensors, wherein the drone is configured to access drone sensor data from the one or more sensors and to sign the drone sensor data using a drone signing key to generate the first trusted contextual content that includes a first digital signature;
    an authentication device that is configured to authenticate data from the trusted contextual content device; and
    a contextual content consumer device that is configured to transmit a request to authenticate data from the trusted contextual content device to the authentication device, and, responsive to an authentication message received from the authentication device, authenticate the first trusted contextual content.

11. The system of claim 10, wherein the contextual content consumer device is configured to present the drone sensor data in a user interface.

12. The system of claim 10, wherein the authentication device is configured to receive the first trusted contextual content and to authenticate the first trusted contextual content based on the first digital signature.

13. The system of claim 10, further comprising:
    a service provider device that is configured to:
       receive the first trusted contextual content;
       generate metadata based on the drone sensor data of the first trusted contextual content;
       generate a data structure including the metadata and the first trusted contextual content; and sign the data structure using a third signing key to generate a third trusted contextual content including a third digital signature.

14. The system of claim 10, wherein the authentication device that is configured to authenticate the second trusted contextual content from the remote controller.

15. The system of claim 14, wherein the contextual content consumer device is configured to present the first set of sensor data in a user interface.

16. The system of claim 14, wherein the authentication device is configured to receive the second trusted contextual content and to authenticate the second trusted contextual content based on a second digital signature.

17. A method comprising:
generating a data structure including a first trusted contextual content and a first set of sensor data captured using one or more sensors configured to capture sensor data responsive to input from a physical environment, wherein the one or more sensors are components of a remote controller for a drone; and
signing the data structure using a signing key to generate a second trusted contextual content.

18. The method of claim 17, wherein the first trusted contextual content includes a first digital signature and the second trusted contextual content includes a second digital signature.

19. The method of claim 17, in which the one or more sensors include a trusted sensor, and further comprising:
signing sensor data captured by the trusted sensor with a signing key of the trusted sensor to generate a third trusted contextual content including a third digital signature, wherein the first set of sensor data includes the third trusted contextual content.

20. The method of claim 17, comprising:
determining a corroboration score by comparing the first trusted contextual content to the first set of sensor data, wherein the data structure includes the corroboration score.

21. A non-transitory computer-readable medium including instructions that, when executed by one or more processors, cause the one or more processors to:
generate a data structure including a first trusted contextual content and a first set of sensor data captured using one or more sensors configured to capture sensor data responsive to input from a physical environment, wherein the one or more sensors are components of a remote controller for a drone; and
sign the data structure using a signing key to generate a second trusted contextual content.

22. The non-transitory computer-readable medium of claim 21, including instructions that, when executed by the one or more processors, cause the one or more processors to:
determine a corroboration score by comparing sensor data from the first trusted contextual content to sensor data from the first set of sensor data; and
generate the data structure to include the corroboration score.

23. The non-transitory computer-readable medium of claim 21, wherein the first trusted contextual content includes a first digital signature and the second trusted contextual content includes a second digital signature.

24. The non-transitory computer-readable medium of claim 21, in which the one or more sensors include a trusted sensor that is configured to:
sign sensor data captured by the trusted sensor with a signing key of the trusted sensor to generate a third trusted contextual content including a third digital signature, and wherein the first set of sensor data includes the third trusted contextual content.

* * * * *